United States Patent [19]

Smith

[11] 4,295,406
[45] Oct. 20, 1981

[54] NOTE TRANSLATION DEVICE

[76] Inventor: Larry C. Smith, 22916 Juniper Ave., Torrance, Calif. 90505

[21] Appl. No.: 68,063

[22] Filed: Aug. 20, 1979

[51] Int. Cl.³ .............................................. G09B 15/02
[52] U.S. Cl. ............................... 84/470 R; 84/485 R; 84/478
[58] Field of Search ................. 84/485, 470 R, 477 R, 84/478, 115, 267; 364/900

[56] References Cited

U.S. PATENT DOCUMENTS

| | | | |
|---|---|---|---|
| 3,429,216 | 2/1969 | Lawrence | 84/477 R |
| 3,554,074 | 1/1971 | Rickey | 84/485 SR |
| 3,978,756 | 9/1976 | Feldman | 84/471 R |
| 3,978,757 | 9/1976 | Johnson | 84/485 R |
| 4,080,867 | 3/1978 | Ratanangsu | 84/478 |

Primary Examiner—L. T. Hix
Assistant Examiner—Stafford D. Schreyer

[57] ABSTRACT

The specification describes a note translation device for translating the notes in printed music to finger numbers, string numbers and fingerboard locations for playing the notes on a guitar. An array of note input switches on the front panel are arranged on a treble staff to correspond to note symbols in printed music. Electronic storage circuitry stores note values selected with these switches. Electronic processing circuitry chooses finger numbers, string numbers and fingerboard locations for playing the selected notes. A visual display on the front panel represents a segment of the instrument fingerboard. After notes have been selected, numbers representing the fingers to be used are displayed by digit indicators along the string representations where the fingers should be placed. Thus, a student can determine how to play the notes without reading music or having an instructor. He merely presses switches corresponding to the printed music and this device translates to fingering information and shows it to him on a display.

Other switches set the device for a capo, for a string re-tuned to a different pitch, or for music in a key other than C. Additional switches enable an individual note to be changed independently of the key, to correspond to an accidental in the printed music. Further additional switches enable the student to change the visual display to show different options for playing the notes.

25 Claims, 16 Drawing Figures

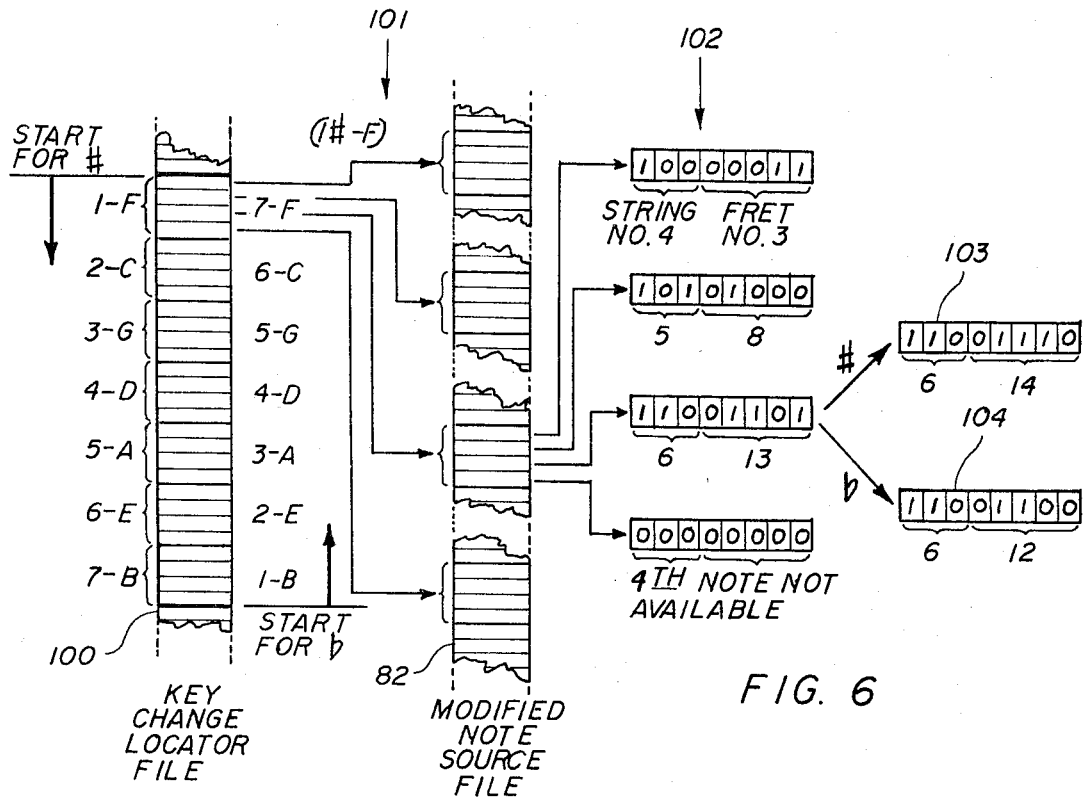
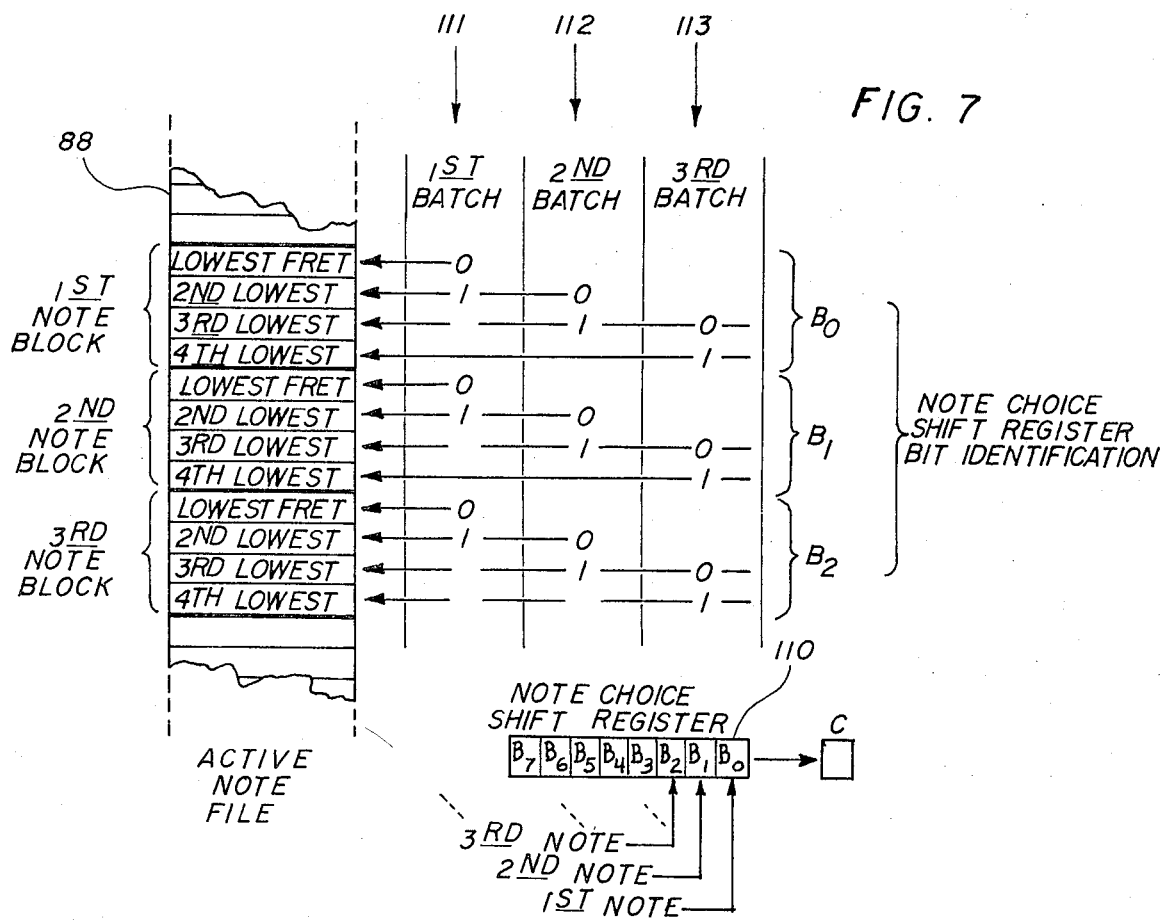

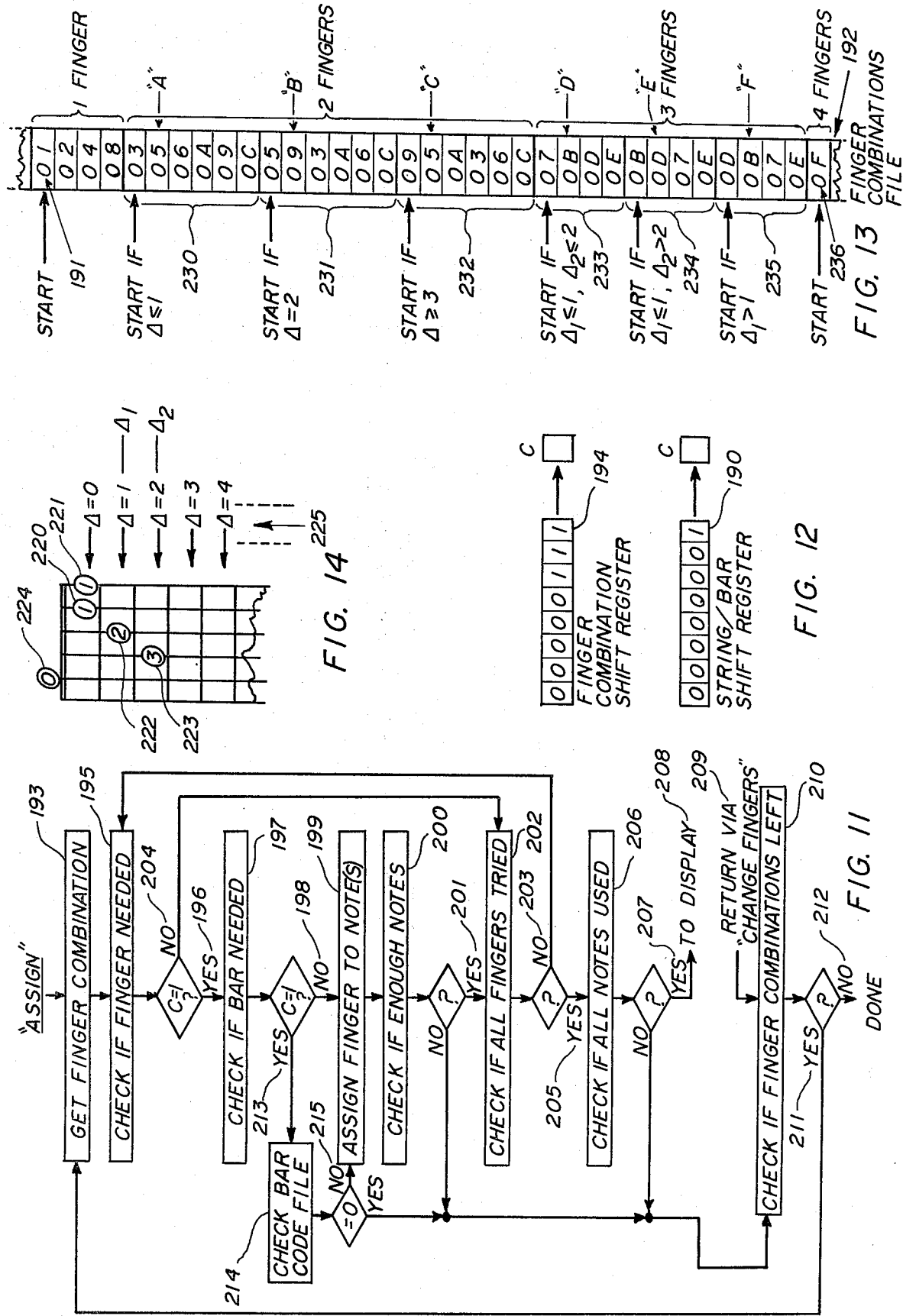

NOTE TRANSLATION DEVICE

BACKGROUND OF THE INVENTION

1. Field of the Invention

Of the various broad classes of musical instruments, stringed fingerboard instruments, such as guitars and violins, are perhaps the most difficult to learn to play by reading printed music. Learning to read printed music written in conventional notation, wherein the note symbols are shown arranged on the treble or base staff as applicable, can in itself be a formidable challenge apart from acquiring the dexterity needed to play the instrument. The difficulty in reading music for these instruments relates to an ambiguity in selecting the strings and fingerboard locations for playing groups of notes. This ambiguity distinguishes stringed fingerboard instruments from other classes of instruments.

Notes played on the popular members of the broad class of horn instruments have a one-to-one relationship to the written note symbols. That is, to play any given note there is a unique combination of valves or a slide position for brass type instruments, or covered holes for reed or flute type instruments. There is no ambiguity involved with interpreting how a note should be played on these instruments. Also, only one note is played at a time which is a further simplification.

The piano is probably most representative of the keyboard class of instruments. Several notes at a time are commonly played on the piano, in contrast to the one note at a time characteristic of horns. However, for the piano, each written note symbol is played with a single unique key on the keyboard, which simplifies reading the music. So even though several notes may be played at once, each note is uniquely defined on the keyboard and there is no ambiguity.

In contrast to the aformentioned classes of instruments, most stringed fingerboard instruments are constructed so that many individual note pitches can be played on more than one string at different fingerboard locations. When several notes are played simultaneously, a combination of the available string and fingerboard locations must be found that are located in the same general proximity in order for the player to press down all the strings at once using just one hand. For example, there are combinations of three note pitches that could be played with more than two dozen distinct combinations of string and fingerboard locations, but most of them could not be played because the fingerboard locations are too far apart. The ambiguity caused by having optional locations for playing the notes is in sharp contrast to the other classes of instruments previously described and it causes extra difficulty in learning to read printed music.

The process of reading printed music requires more than a knowledge of the relationship between the conventional note symbols and the corresponding string and fingerboard locations. The student must also understand key changes and how to account for their sharps and flats. Occasionally music written for special stringed fingerboard instruments like the guitar will require a string to be tuned to a pitch different from its normal pitch and the student should be familiar with this. He should also understand how to adjust for the situation where the music is written for using a capo installed on the fingerboard if he wants to use a capo. It is common to find sharp, flat and natural accidentals in printed music so the student should know how to adjust to account for them also. Furthermore, because of the ambiguities previously described, the student may need to determine several string and fingerboard locations in order to know which option is best. To further complicate matters it is not always apparent which fingers should be used to play the strings, whether there is a combination among the options that allows a bar to be used to simplify the fingering, or if there happens to be a particular higher position on the fingerboard that affords an easier arrangement to finger. With all the above factors to consider, reading printed music can be a challenge for a musical student.

If is thus an object of the present invention to provide a note translation device to translate printed music to string and fingerboard locations for playing the music on a stringed fingerboard instrument. It is a further object of the present invention to provide a note translation device that indicates the fingers to use for pressing down the strings. A still further object is to provide a note translation device that is adaptable to a wide variety of musical needs whereby it can be set to adjust for music written for key signatures other than the key of C, for a capo installed on the instrument fingerboard or for an instrument with a string off-tuned to a different pitch. Moreoever, an additional object of the present invention is to provide a visual display to show the finger numbers and string and fingerboard locations on a simulated segment of a guitar fingerboard, with controls to change the display so it shows various options for playing the notes. Another object of the present invention if to provide a note translation device which can be operated by a beginning student by merely imitating the written musical note symbols via representative keyboard note switches.

2. Description of the Prior Art

Assorted devices have been conceived to aid in teaching various aspects of playing stringed fingerboard instruments. However, note of them provide the capability to translate printed music to fingering information as is done by the present invention. For example, U.S. Pat. No. 3,554,074 STRINGED INSTRUMENT TEACHING DEVICE describes a slide rule type of device for showing the fingering to use for a limited number of scales at various fingerboard positions. Scales, which are used for learning exercises, are played as predetermined sequences of notes played one at a time either continuously increasing or decreasing in pitch. Scales have existed for hundreds of years and they are defined in a large number of exercise books that are readily available. The referenced device, in effect, combines several pages of well known scales and condenses them into a more compact arrangement. It is probably useful for its intended but very limited purpose, but it has no application to the far more complex and generalized problem of translating printed music to fingering information, as is solved by the note translation device of this disclosure.

Another teaching device is described in U.S. Pat. No. 3,978,756 GUITAR INSTRUCTION SYSTEM. It includes special printed music written backwards, and note identifying labels that are placed on the guitar fingerboard, which are also written backwards. These items are all viewed through a mirror so they appear to be written forward, with the purpose being that the student can therefore see all instructional material as well as the guitar fingerboard while looking at the mirror to avoid looking back and forth between the music and the fingerboard. The labels placed on the guitar fingerboard and the special music are correlated with notations and colors so the student can determine where to press down the strings. The special music has to be prepared for each musical compositon to be taught. The student is thus dependent on a limited source for this special music. This is in contrast to the present note translation device wherewith the student can translate any conventional printed music he chooses and therefore has access to a vast body of music that is readily available.

Another device that has application to teaching music for stringed fingerboard instruments is described in U.S. Pat. No. 4,080,867 ELECTRONIC DISPLAY SYSTEM FOR MUSICAL INSTRUMENTS. A magnetic tape is prepared that has codes for the string and fingerboard locations to use for playing selected musical compositions. The tape is played to show where the notes are located on the fingerboard of the instrument so the student can duplicate them (the fingers to be used aren't identified). A special tape has to be prepared for each musical composition to be taught. The student is thus dependent on a limited source for these tapes. This is in contrast to the present note translation device wherewith the student can translate any conventional printed music he chooses and therefore has access to a vast body of music that is readily available. The string and fingerboard location information contained in the tape used with the reference device is prepared by someone who is able to read printed music; the reference device does not have the capability of the present invention to translate note information to string and fingerboard location information or to assign finger numbers to use for playing the notes.

SUMMARY OF THE INVENTION

This invention translates printed music note information into the string and fingerboard location information used for playing the music on a stringed fingerboard instrument. Electronic storage circuitry retains the note information as it is entered into the device. Additional electronic processing circuitry accesses this stored note information and chooses strings and fingerboard locations for fingering the instrument to play the notes. In a preferred embodiment of the present invention, further electronic processing circuitry accesses the string and fingerboard information chosen by the device and assigns finger numbers to each fingerboard location that is used. Also included in this preferred embodiment is a keyboard switch array located on the front panel of the device for entering the note information, and a visual display that is also located on the front panel to show the string and fingerboard location information. Included in the keyboard switch array are note switches that are arranged on a picture of a treble staff at locations corresponding to the note locations in printed music. They are selectively operable to input the notes shown in the printed music that is to be played. This visual display is representative of a segment of a guitar fingerboard with string and fret representations. Selectable digit indicators are located at each intersection of the string and fret representations where the strings would be pressed for playing notes. When the operator of the device would like to know how to play the notes shown in the printed music, he presses the corresponding note switches located on the treble staff shown on the front panel of the device. This device then translates the notes from the printed music into fingering information and displays it as numbers representing the fingers to be used which are displayed by the digit indicators of the visual display at the proper locations where the fingers should be placed.

Other switches are included for adapting the device for use when a capo is installed on the fingerboard, when a string of the instrument is re-tuned to a different pitch, or when the printed music is in a key other than the key of C. Additional switches enable an individual note to be changed independently of the key, to correspond to a sharp, flat or natural accidental depicted in the printed music. Further additional switches are included to enable the operator to change the visual display to show different options for playing the notes, since in most cases the same note pitches can be played on different combinations of strings or by using different fingers.

While the preferred embodiment pertains to a guitar, this invention is applicable to other stringed fingerboard instruments. With slight modifications that will be recognized by those skilled in the arts which apply to this invention, other embodiments can be devised to pertain to other related instruments, such as violins, banjos and cellos for example.

BRIEF DESCRIPTION OF THE DRAWINGS

For a more complete understanding of the present invention and for further objects and advantages thereof, reference is now made to the following detailed description taken in conjunction with the accompanying drawings, in which:

FIG. 6 is a schematic diagram that illustrates a key change location file that may be used by the electronic processing circuitry for affecting key changes, and it further illustrates the modifications that may be made to the string and fingerboard location information to represent notes that are sharped or flatted;

FIG. 7 is a schematic diagram of a method that may be used by the electronic processing circuitry for selecting combinations of string and fingerboard locations;

FIG. 11 is a flow diagram that further defines the processing steps that may be used by the electronic processing circuitry to perform the "Assign" process referenced in FIG. 11;

FIG. 12 is a schematic diagram that defines shift registers used by the electronic processing circuitry in conjunction with the "Assign" process shown in FIG. 11;

FIG. 13 is a schematic diagram that illustrates a finger combinations file that may be used by the electronic processing circuitry in conjunction with the "Assign" process shown in FIG. 11;

FIG. 14 is a schematic diagram that shows the information that would be shown by the display after the electronic processing circuitry performed the processing methods defined by the preceeding figures, for the conditions where the shift registers contain the information shown in FIG. 12 and the string/fret locations are as shown in the upper example of FIG. 9;

DESCRIPTION OF THE PREFERRED EMBODIMENT

Figure 1:
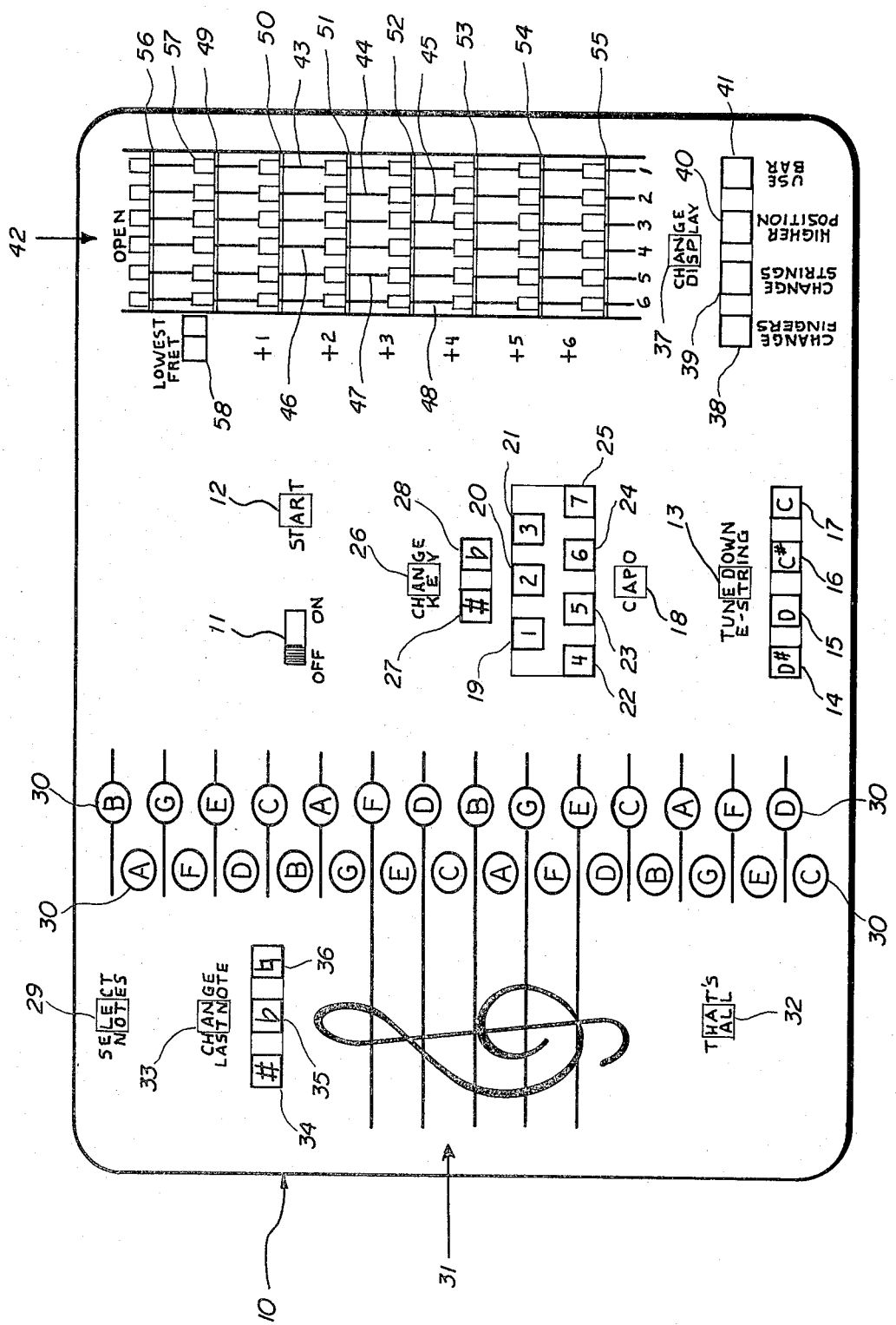
FIG. 1 is an illustration of the front panel of the note translation device of the present invention.

FIG. 1 illustrates the front panel 10 of the note translation device for stringed fingerboard musical instruments representative of the preferred embodiment of the present invention. The invention is described and illustrated by the preferred embodiment as it could apply for a guitar. However, this invention is applicable to other stringed instruments. Thus, this invention is applicable to the broad class of multiple stringed instruments wherewith the note pitches are controlled by the player pressing the strings against a fingerboard with his fingers. This will become apparent when the description of the preferred embodiment has been read and understood.

Included on the front panel 10 is a keyboard switch array 11–41 to control the operation of the device and to enter musical note selections. Also included is a visual display 42 to show finger numbers and string/fret locations used for playing the notes. The visual display 42 is shown as a simulated segment of a guitar fingerboard.

The keyboard switch array 11–41 may be divided into three general areas for convenience to the operator. Initialization switches 11–28 located in the central area of the front panel 10 are used to turn on the device and initialize it to correspond to the structure of the musical composition. Occasionally, major changes to the musical structure occur within the composition and the initialization switches 11–28 are again used for re-initializing the device. Note input switches 29–36 located in the area to the left of center are used to input musical note selections the operator would like to play. The note switches 30 are arranged on a picture of a treble staff 31 to correspond with the accepted musical notations used with printed music. Change entry switches 33–36 enable the operator to modify an individual note after it has been selected. Display change switches 37–41 located in the area to the lower right of center are used to control changes to the display after all notes have been selected and the display mode entered. During the display mode, the visual display 42 shows the finger numbers and string/fret locations for playing the notes. The operation of all the keyboard switches 11–41 will be described subsequently in greater detail.

The visual display 42 is representative of a segment of a guitar fingerboard. The six vertical lines 43–48 are string representations. The seven double horizontal lines 49–55 are fret representations. The uppermost double horizontal line 56 represents the nut of the guitar. The locations just above the intersections of the string representations with the fret representations are where fingers are placed on the guitar to play the notes. There are windows 57 at these locations on the front panel 10 that allow the operator to view photo-optical numeric display digits that show the numbers of the fingers used to play the notes that were entered using the note input switches 29–36. Conventional finger numbering designators are used; 1 for the first or index finger, 2 for the middle finger, 3 for the ring finger and 4 for the pinky finger. An open string, where a note is played on the string without the string being held against the fingerboard with a finger, is indicated by a zero being displayed in the uppermost row of windows just above the nut representation 56.

The LOWEST FRET indicator 58 displays a number corresponding to the lowest fret upon which a finger should be placed. For example, a five shown in the LOWEST FRET indicator 58 would mean that fingers shown on the fret representation 49 immediately to the right of the LOWEST FRET indicator 58 should be played on the fifth fret of the guitar. Fingers shown on the next fret below should be played on the sixth fret and so forth. This allows the display to be implemented by representing just a segment of the fingerboard which has approximately 19 frets. The fingerboard segment used with this embodiment is more than sufficient for most display needs. However, it is within the scope of this invention to increase the number of fret representations displayed up to the number for a complete fingerboard.

Referring again to the switches located in the central area of the front panel 10, slide switch 11 applies electrical power to the electronic processing circuitry when moved to the ON position. When power is first applied the electronic processing circuitry is automatically initialized in the same manner as is accomplished by pressing the START switch 12. Therefore, pressing the START switch 12 is optional when power is first applied, but it must be pushed to reinitialize the device after it has been used for displaying selected notes as described earlier. The switch TUNE DOWN E-STRING 13 is used to adjust the device for displaying the string/fret locations as they would appear on a guitar fingerboard with its E-string tuned down to one of the note pitches shown on the switches below it 14–17. When the E-string is tuned down it is usually set with the D switch 15. The sequence to accomplish this is to press the switch TUNE DOWN E-STRING 13 and then the D switch 15.

The switch CAPO 18 is used to adjust the device for displaying the string/fret locations as they would appear on a guitar fingerboard with a capo installed on the fret number shown on the switches above 19–25. The sequence to accomplish this is to press the switch CAPO 18 and then one of the numbered switches 19–25 for the capo location. The number corresponds to the fret number, counted from the nut 56 that the capo would be installed on for the guitar. All display information is then referenced to the capo instead of the nut 56. A zero shown in the uppermost row of windows is for an open string in the sense that the respective string would be played but not pressed against the fingerboard by the player's finger, it would be held down by the capo. Values in the LOWEST FRET indicator 58 are relative to the capo instead of the nut.

The last and most often used function of the switches located in the central area of the front panel 10 is to adjust for a change of key in the music. This is accomplished as follows:

A. Press the switch CHANGE KEY 26
B. Press one of the key switches 27-28 corresponding to whether sharps or flats are used respectively, and
C. Press one of the numbered switches 19-25, numbered 1 through 7, for the number of sharps or flats.

The operator can perform this adjustment very easily without having to have an understanding of the musical theory involved. If the music were in the key of C, then no key change would be made since there are no sharps or flats in the key C.

Note selections are entered using the note input switches 29-39 located on the treble staff 31 shown to the left of center on the front panel 10. The switch SELECT NOTES 29 is pressed to adapt the electronics for accepting notes entered via the note switches 30. The operator process the note switches 30 that correspond to the note symbols written for the printed music, and thus no ability to read music is needed, in the sense of understanding how to translate the note. The operator merely imitates on switches 30 what is written in the printed music. From one to six notes can be entered. If six notes are entered, the device goes to the display mode automatically and ignores additional notes since six notes is the most that can be fingered simultaneously with the six string guitar described for this embodiment. When less than six notes are used, the switch THAT'S ALL 32 is pressed after the last note in order to enter the display note. In the display mode, all numbered finger locations are shown simultaneously. When not in the display mode, the display is inactive and appears blank.

The selected notes can correspond to either a chord in the musical composition, a sequence of notes, or a combination of chord and sequential notes. Although the numbered finger locations will be displayed simultaneously, the operator can play any subset of the notes in any sequence he chooses, and the note locations and finger numbers shown will still be valid. Thus, the device is very adaptive to a wide assortment of musical applications.

If one of the notes in the printed music is modified with respect to the key signature, this adjustment is made as the next step after the note is entered by pressing the switch CHANGE LAST NOTE 33 and then one of the modification switches for ♯, ♭, or ♮ 34-36. Other notes are unaffected unless they are likewise modified.

When the display mode is entered, the first fingering combination displayed will usually be the easiest to finger for the average person. However, there are many variables that can affect the choice, such as the position of the guitar fingerboard that the preceeding and following notes are played at, the size and reach of the player's hand, and the ability to use bars. To accomodate these variables, there are several options to change the finger numbers and string/fret locations displayed.

The first option is to use the same strings and frets, but to use different fingers. This is done by pressing the switch CHANGE DISPLAY 37 and then the switch CHANGE FINGERS 38. The string/fret locations will remain the same but a different combination of fingers will be selected and displayed. If the operator would like a different choice of strings to use for playing the same notes he presses the switch CHANGE DISPLAY 37 and then the switch CHANGE STRINGS 39. This can be useful for locating a combination of string/fret locations that uses one or more of the same strings as another group of notes just played or to be played next. If these same strings can be pressed down with the same fingers, then less finger movement might be needed to move from one group of notes to the next. If the operator would like to move a group of notes as a whole to a generally higher fret position, he presses the switch CHANGE DISPLAY 37 and then the switch HIGHER POSITION 40. This feature has advantages similar to those just described for changing strings. In fact, if the change string feature is repeated enough times it will eventually display the same strings as this feature, the difference being that with this feature the higher position is reached immediately. This serves as a short cut to a position that is usually about five frets higher on an average. Finally, if the operator prefers to use a bar he presses the switch CHANGE DISPLAY 37 and then the switch USE BAR 41. Bars are frequently used to finger notes in the higher positions, and it is useful to have this capability to display them without the operator having to search through all the various display combinations to find them. Although bars are also displayed during the normal sequence of changing the fingers and strings as described above, it sometimes requires many changes before they appear in their normal order, so this is a convenient short cut. The four options described above can be used in any order and as many times as the operator would like. After all finger or string/fret options have been tried, the next option will return to the beginning of the respective display sequence.

When the operator is ready to enter another group of notes he presses the switch SELECT NOTES 29 after which the steps described above for entering notes and displaying numbered fingers can be repeated with the new notes. If the musical composition changes key, capo usage or E-string tuning, the user presses the switch START 12 and begins with the needed adjustments provided by the remaining central group of switches 13-28.

When any switch closure is detected and determined to be valid by the electronic processing circuitry an audible signal is emitted to signal the operator of a proper entry. Other signals, such as indicator lights could also be used. For a switch closure to be valid it must occur in a pre-established sequence. The sequence is the same as was used in the preceeding description for the operation of the switches on the front panel 10. That sequence consisted of a single pass through the switches 12-28 located centrally on the front panel 10 to initialize for the structure of the musical composition, and then alternately using the switches on the left side 29-36 to enter notes, and then the switches on the lower right side 37-41 to change the display if needed.

Any of the functions once started, such as change of key, must be completed before any other function such as selecting notes can begin. Out of sequence switch closures are ignored by the processing electronics and this is indicated to the operator by the lack of an audible signal in response to him pressing a switch. This reduces operator caused errors and precludes the need for additional displays to control the sequence of entries.

Figure 2:
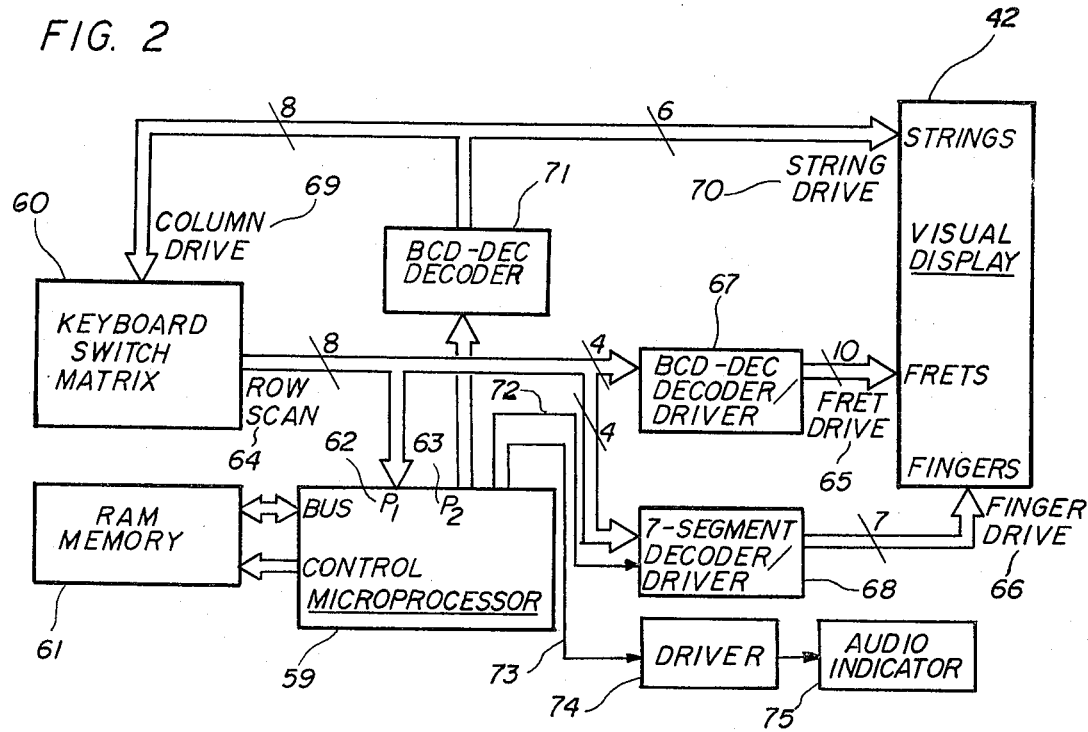
FIG. 2 is an example circuit diagram of electronic processing circuitry which may be used in a device according to FIG. 1.

Refering to FIG. 2, the electronic processing circuitry for the note translation device is illustrated. The MICROPROCESSOR 59 controls the information processing, and operations of the KEYBOARD SWITCH MATRIX 60, VISUAL DISPLAY 42, and interconnecting circuitry. A general purpose microprocessor, such as an 8049 I/C having an 8-bit word size and 2048 words of permanent internal information storage capacity, commonly termed read only memory, or ROM, can provide this capability. The 8049 I/C also includes 128 internal working registers, and two 8-bit input/output ports in addition to its bus which is a multiplexed address and data port. Additional random access memory, or RAM MEMORY 61, for temporary information storage used in a conjunction with the operation of the MICROPROCESSOR 59, can be provided by an 8155 I/C. For a complete description of this representative microprocessor and its support memory devices, the Intel MCS-48 Microcomputer User's Manual available from Intel sales and marketing offices located throughout the U.S. and foreign countries may be used. Clock and initialization circuitry and electrical power requirements are also fully described in this manual.

The MICROPROCESSOR 59 communicates with the KEYBOARD SWITCH MATRIX 60 when in the keyboard scan mode, and with the VISUAL DISPLAY 42 when in the display mode, via the same two 8-bit input/output ports P1 62 and P2 63. P1 62 inputs 8 bits of ROW SCAN 64 information into the MICROPROCESSOR 59 during the keyboard scan mode, and during the display mode outputs code for FRET DRIVE 65 with the 4 most significant bits and code for FINGER DRIVE 66 with the 4 least significant bits. The code for FRET DRIVE 65 is decoded by the BCD-DEC DECODER/DRIVER 67, which could be a 74145 I/C for example, and then the decoded information is supplied to the VISUAL DISPLAY 42 to control the display of the frets. The code for FINGER DRIVE 66 is decoded by the 7-SEGMENT DECODER/DRIVER 68, which could be a 4511 I/C for example, and then supplied to the VISUAL DISPLAY 42 to control the display of finger numbers.

The first three bits of port P2-high 63 output code for the COLUMN DRIVE 69 used during the keyboard scan mode, and the code for STRING DRIVE 70 used during the display mode. The BCD-DEC DECODER 71, which could be a 4028 I/C for example, decodes the binary coded signals supplied by MICROPROCESSOR 59. The fourth bit 72 of port P2-high 63 is connected to the 7-SEGMENT DECODER/DRIVER 68 for blanking the display whenever ports P1 and P2-high 63 contain information that would cause an unwanted display to occur. The fifth bit 73 of port P2-high emits the audible signal to indicate when a valid switch closure has been detected by the MICROPROCESSOR 59.

During the keyboard scan mode, the COLUMN DRIVE 69, which is connected to the output terminals 0-7 of BCD-DEC DECODER 71 are connected to columns 0-7 of the KEYBOARD SWITCH MATRIX 60, which is arranged as an 8×8 matrix, of which 55 of the possible 64 switch positions are used. The columns of the matrix, one at a time in sequence, are active low at which time all the rows are simultaneously sampled for a key closure by port P1 62. Each pin of P1 62 is held high by a high impedance connected to the positive voltage supply by circuitry internal to the MICROPROCESSOR 59 unless it is forced low by a switch closure connecting it to an active low column. The rows are counted, starting with the first column and continuing with sequential columns, until either a switch closure is detected by a low condition, or else the last row of the 8th column is checked, at which time the process starts over if the keyboard scan mode is continued. The count present when a switch closure is found is then interpreted by the MICROPROCESSOR 59 to represent the associated switch that was pressed. Output terminals 0-5 of BCD-DEC DECODER 71 are also connected to the VISUAL DISPLAY 42 to control the display of strings to be used during the display mode.

Figure 3:
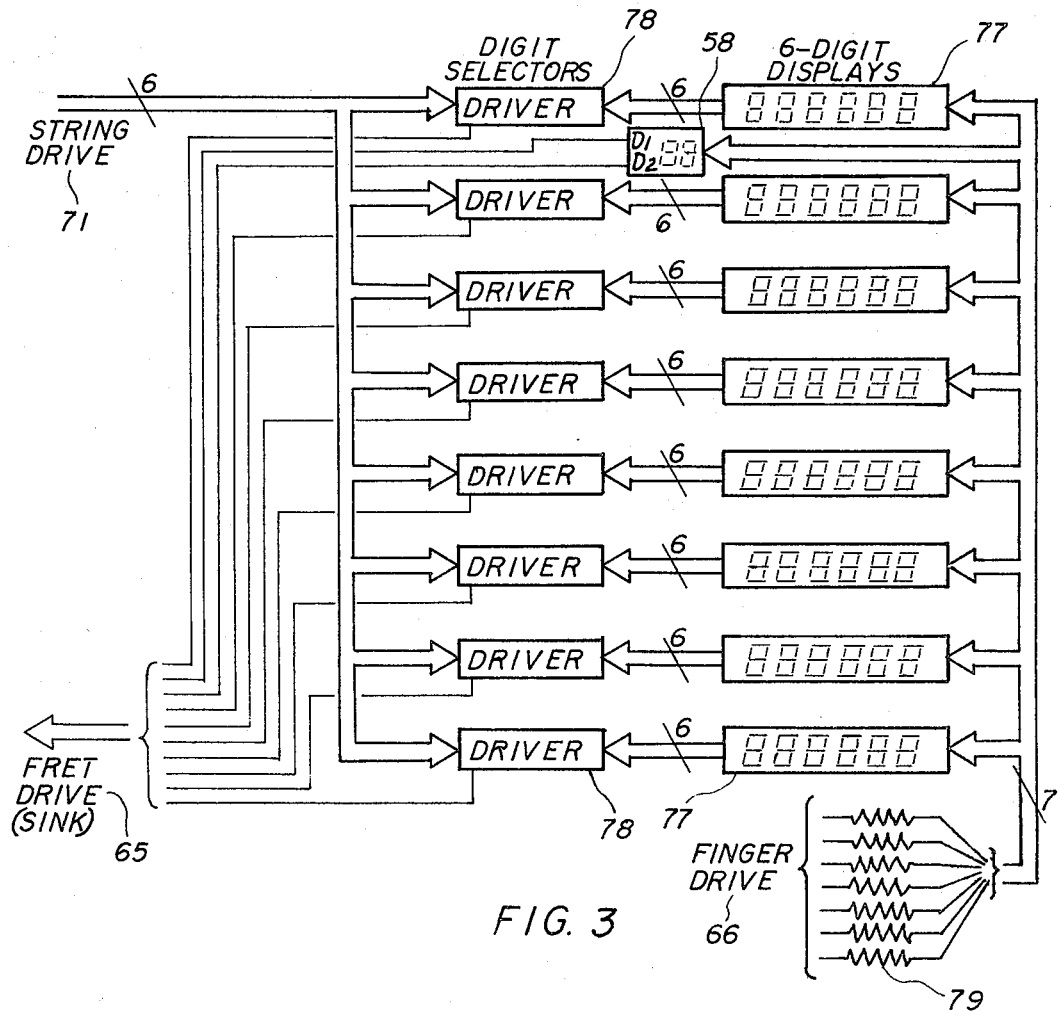
FIG. 3 is an expanded view of a circuit network for a visual display which may be used according to the circuit diagram in FIG. 2.

FIG. 3 illustrates the implementation of the VISUAL DISPLAY 42 refered to in conjunction with the description of FIGS. 1 and 2. It includes 8 6-DIGIT DISPLAYS 77, 8 DIGIT SELECTORS 78 to drive the digits of their respective 6-DIGIT DISPLAYS 77, and a single 2-digit LOWEST FRET indicator 58. A unique three dimensional matrix switching approach is used to control all 50 7-segment digits, for a total of 350 segments, in what appears to the eye as continuous illumination. LED digits are described for the preferred embodiment, whereas those skilled in the art will recognize that other display means such as LCD and gas discharge could be implemented.

The FINGER DRIVE 66 acts as a source to supply positive voltage to the anodes of the digit segments that represent the finger number to be displayed. It is connected to all of the digits of all the 6-DIGIT DISPLAYS 77 simultaneously. Each of the 7 FINGER DRIVE 66 lines includes a series current limiting resistor 79; a resistance value of 100 ohms was found to provide suitable brightness for LED displays having 0.125 inch character height. The cathodes of all seven segments of each digit are connected to a common cathode terminal.

None of the digits is activated until its common cathode is connected to the electrical return circuit. The STRING DRIVE 71 acts to connect all of the common cathodes of the same digit in all of the 6-DIGIT DISPLAYS 77 to the return circuit via the DIGIT SELECTORS 78. These digits all lie in a vertical column in alignment with the paper string representation 43-48 of FIG. 1. However, the ground paths of the DIGIT SELECTORS 78 are each connected to the return circuit by a different active line from the FRET DRIVE 65. Only one FRET DRIVE 65 line is active at a time. When the selected FRET DRIVE 65 line is active, it completes the electrical circuit through a single DIGIT SELECTOR 78 that activates a single digit in the 6-DIGIT DISPLAY 77. This digit is in alignment with the intersection of proper string representation 43-48 and fret representation 49-56 in FIG. 1. Thus, a single digit is selected that has the assigned finger number and is at the desired string/fret location.

The segments for the LOWEST FRET indicator 58 are also driven by the FINGER DRIVE 66. The common cathode of the desired digit is selected by the FRET DRIVE 65 which completes the return circuit.

When in the display mode, from one to six string/fret locations can be displayed, plus the two digits for the LOWEST FRET indicators 58, for a maximum of eight digits per display cycle. A constant display time is allocated to each of the eight digits, even if fewer digits are used, in order to maintain the same display brightness. This results in a duty cycle of approximately 12.5 percent per digit, the exact value being somewhat smaller to account for the time used for control and switching operations, and for a keyboard scan between display cycles. Keyboard scans between display cycles are used to allow the operator to use switches CHANGE DISPLAY 37 and SELECT NOTES 29 as shown in FIG. 1 to interrupt the display mode.

Figure 4:
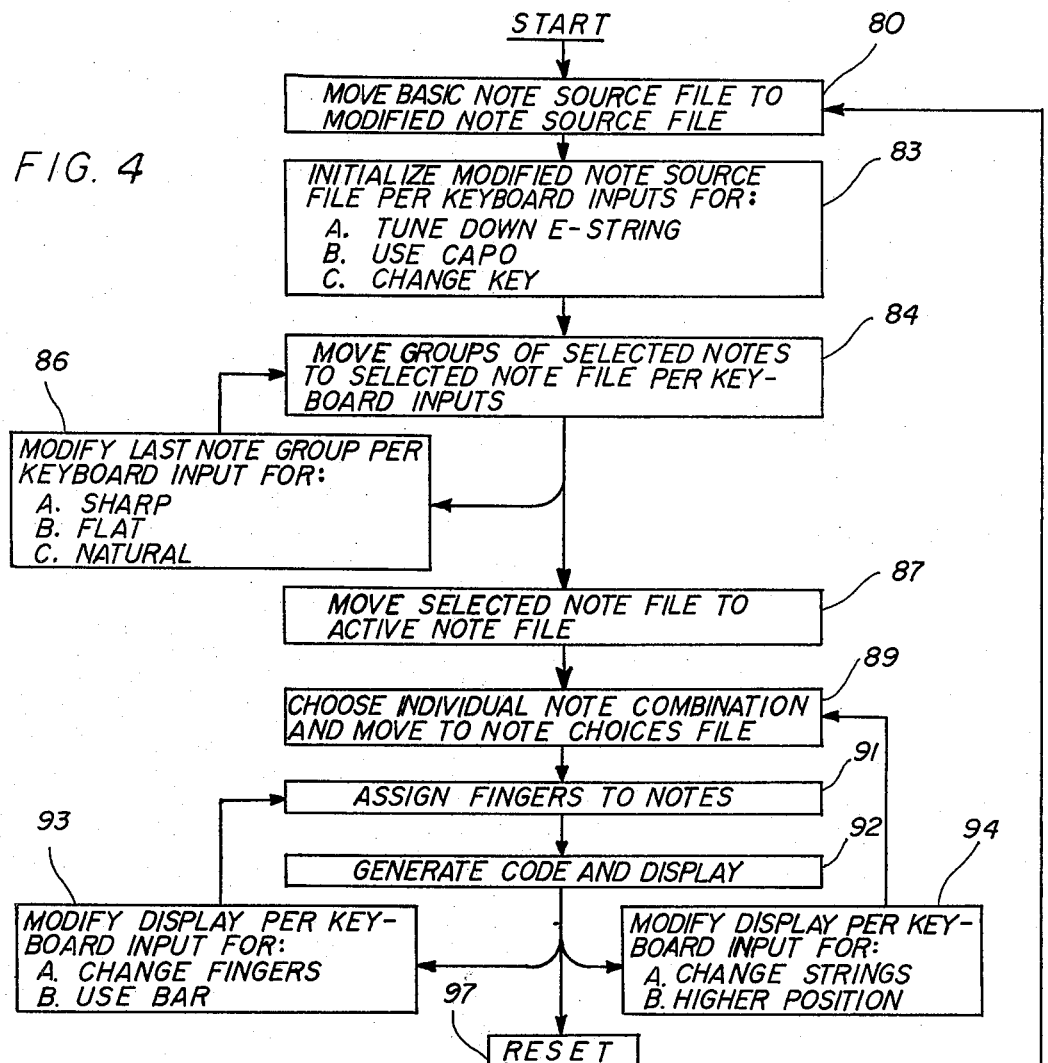
FIG. 4 is a flow diagram that defines the major processing steps that may be used by the electronic processing circuitry according to the present invention.
Figure 5:
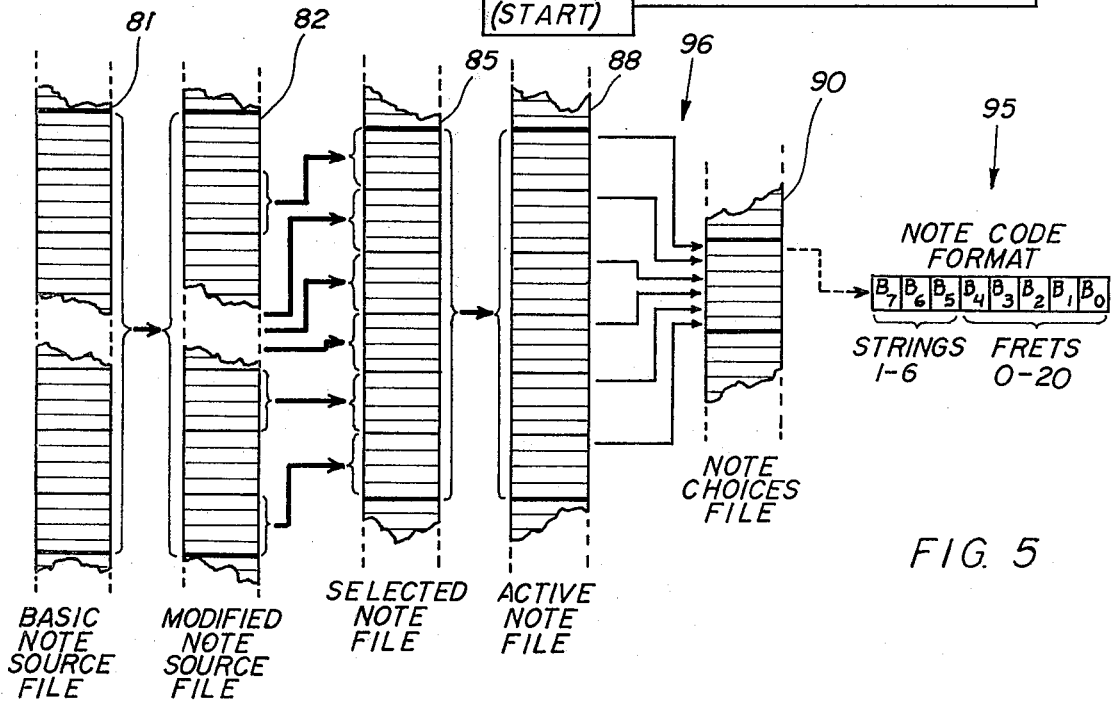
FIG. 5 is a schematic diagram that illustrates the information files and flow of information that may be used by electronic processing circuitry of FIG. 2, and it also defines a note code format that may be used to identify the string and fingerboard location information contained in these files.

In order to perform the functions that have been described, the processing electronics handles groups of information that are organized and labeled as specific data files. FIGS. 4 and 5 define several of these files and illustrate in an overall sense how these files are handled during the operation of the note translation device. These files are contained in the ROM and RAM memories.

The first files referenced in FIG. 4 are for the move 80 of the BASIC NOTE SOURCE FILE 81 to the MODIFIED NOTE SOURCE FILE 82 shown schematically in FIG. 5. The structure of these files is related to the construction of the particular mucical instrument to which the embodiment of the invention pertains. The preferred embodiment pertains to the guitar where note pitches can be played with from one to four string/fret locations. The open E on the 6th string for example, can not be played on any other string so it is limited to one string/fret location. However, consider the E that is played open on the 1st string. It can also be played on the 5th fret of the 2nd string, 9th fret of the 3rd string or 14th fret of the 4th string. Some guitars have a 19th fret for the 5th string where the note could be played again, but this part of the fingerboard is virtually unreachable and seldom if ever used. Four string/fret locations is sufficient for a typical guitar so these files are formed with four spaces allocated to each note. When less than four string/fret locations are available for playing a note, zeros are used to fill up the excess address spaces and the processing electronics are adapted to recognize that this means that no string/fret locations are available at these locations (with the exception of a dummy code technique to be subsequently described).

Only natural notes are contained in the BASIC NOTE SOURCE FILE 81 illustrated in FIG. 5. This will be explained in greater detail in the description of the methods used for changing keys and for sharping and flatting individual notes. Many of these natural notes can be played in four different octaves on the guitar. For example, the E played open on the 6th string can be played an octave higher at the 2nd fret of the fourth string, or another octave higher open on the 1st string, or still another octave higher at the 12th fret of the 1st string. Four octaves are allocated for each of the seven natural notes into which each octave is divided. The resultant total number of string/fret location address spaces for this file is seven natural notes multiplied by four octaves, for 28 note pitches, multiplied by four potential string/fret locations per note for a total of 112 address spaces.

Returning to FIG. 4 (file names are in reference to FIG. 5) the BASIC NOTE SOURCE FILE 81 if moved 80, or copied, from ROM to a location in RAM where it is labeled the MODIFIED NOTE SOURCE FILE 82 because it is often modified during operation of the device, whereas the BASIC NOTE SOURCE FILE 81 can not be modified since it resides in ROM. The MODIFIED NOTE SOURCE FILE 82 is modified, or initialized 83, in response to the keyboard switches TUNE DOWN E-STRING 13, USE CAPO 18 and CHANGE KEY 26 shown in FIG. 1. The purpose of these modifications was briefly described in the discussions that accompanied that figure. Their implementation will be described sebsequently in greater detail. A group of selected notes is moved 84 from the MODIFIED NOTE SOURCE FILE 82 to the SELECTED NOTE FILE 85 in response to the operator pressing the keyboard note switch that has an associated value which, when a constant is added to it, the resultant sum identifies the first address of the block of four possible string/fret locations in the MODIFIED NOTE SOURCE FILE 82. After each note is entered there is an opportunity to modify it 86 for a sharp, flat or natural accidental.

FIG. 5 illustrates the moves to the SELECTED NOTE FILE 85 and how blocks of four string/fret locations are handled. The transfers from the MODIFIED NOTE SOURCE FILE 82 are illustrated as they might occur with the moves starting at the top of the file and continuing toward the bottom. However, the blocks can be located in any order in the MODIFIED NOTE SORUCE FILE 82 and will be filed in the SELECTED NOTE FILE 85 in the sequence with which the notes were entered into the device. Returning to FIG. 4, when all the notes are entered, the switch THAT'S ALL 32 in FIG. 1 is pressed to move 87 the SELECTED NOTE FILE 85 to the ACTIVE NOTE FILE 88. In the following discussions it will be shown how the ACTIVE NOTE FILE 88 becomes modified in the process of choosing string/fret location combinations, whereas the SELECTED NOTE FILE 85 is retained as an unchanging refernce source for the selected string/fret locations until new notes are entered.

Once the ACTIVE NOTE FILE 88 is formed, a combination of string/fret locations is chosen 89, by methods to be subsequently described, and filed in a location in RAM called the NOTE CHOICES FILE 90. Finger numbers are assigned 91 to these string/fret locations if feasible and then the code is generated for display 92. Several options are available to modify the display in response to keyboard switch inputs 93-94. These are via the switch CHANGE FINGERS 38 in FIG. 1 which uses the same string/fret locations but changes the finger numbers, the switch USE BAR 41 which attempts to use the same finger to play more than one note, and the switches CHANGE STRINGS 39 and HIGHER POSITION 40 in FIG. 1 which change the strings, frets and or fingers. Reset 97 is accomplished by pressing the switch START 12 in FIG. 1 which initializes the device to allow the entire process to begin again. Besides illustrating the format and the file moves just described, FIG. 5 shows the NOTE CODE FORMAT 95. The first 5 bits identify the fret and the last 3 the string. The code for both is standard binary.

FIG. 6 illustrates the method of modifying the MODIFIED NOTE SOURCE FILE 82 for sharps and flats. A KEY CHANGE LOCATOR FILE 100 holds the first address in the MODIFIED NOTE SOURCE FILE 82 for each of the blocks of four string/fret locations. These addresses are arranged in the KEY CHANGE LOCATOR FILE 100, starting from the top of the file, for all the F notes, then the C notes, and so on in the order for increasing the number of sharps.

Four addresses for each note is sufficient, as explained earlier, to cover up to four octaves for each note. With this arrangement, one sharp affects 16 address locations, 2 sharps affects 32 address locations and so forth. A maximum of 7 sharps is used with this device, and they access all 112 addresses in the MODIFIED NOTE SOURCE FILE 82.

The example in FIG. 6 also illustrates how one sharp would be processed 101. The addresses in the KEY CHANGE LOCATOR FILE 100 would access the four groups of four string/fret locations as indicated by the arrows. One of these groups of four string/fret locations is shown as it would appear with its associated coding 102. This happens to be the F located just below middle C. Its lowest position on the guitar is on fret number 3 of string number 4. It can also be played on fret number 8 of string number five or fret number 13 of string number 6. There is no fourth location to play this note so it is coded 00. Using the third location to continue with the example, it is shown how the code would look after incrementing and decrementing for a ♯103 and a ♭104 respectively. This process will be described later in more detail. Returning to the KEY CHANGE LOCATOR FILE 100 of FIG. 6, it was explained how the indicators along the left side define how many address locations to use corresponding to the number of sharps selected. The right side is similarly indicated for flats. However, for flats the starting location is at the bottom instead of the top. The same procedure as was used for sharps is used in reverse. As an example, for 3 flats, all of the addresses from the bottom upward to the twelfth address from the bottom would be accessed. 48 addresses in the MODIFIED NOTE SOURCE FILE 82 therefore would be processed.

To sharp a note, its NOTE CODE FORMAT 95 defined in FIG. 5 is simply incremented since this increases by one the fret number at which the note is played. The procedure would have been more complicated if a single/fret location were incremented to where it first duplicated the pitch of the next higher open string. This next higher open string would be omitted by this simple incrementing process. However, none of the natural notes of which the MODIFIED NOTE SOURCE FILE 82 is comprised, make this transition when they are sharped. Take the fourth string of the guitar for example. It transitions to the third string in going from the fourth fret to the fifth fret; the fourth fret is an F sharp, which is not a natural note. This is the case for all other notes as well, so it is valid to simply increment the string/fret locations in the MODIFIED NOTE SOURCE FILE 82 as described to account for sharps in the key signature.

Sharping a single note via switches Change Last Note 33 and ♯34 in FIG. 1 work the same way, except here the modification is made to just the last block of notes written into the SELECTED NOTE FILE 85 in FIG. 5. A double sharp can lead to an omitted note due to the string transition just described, but this was deemed acceptable for the preferred embodiment. However, the possibility of such a missing note could be avoided, for example, by substituting the next higher note block from the MODIFIED NOTE SOURCE FILE 82, which has the note which would otherwise be missing. For substituted note blocks that are only one-half step higher, C for B and F for E, those new blocks would also be incremented one time. This procedure could be used to avoid any missing notes for double sharps.

Flats have special considerations also. A flatted (decremented) open string doesn't exist on the same string anymore. When an open string is among a block of string/fret locations to be flatted, the note is eliminated and all the other string/fret locations in that block in the MODIFIED NOTE SOURCE FILE 82 are shifted up one space to fill that space. The same is done when a single note is flatted by switches Change Last Note 33 and ♭35 shown in FIG. 1.

Modifications to the MODIFIED NOTE SOURCE FILE 82 are also made for the use of a capo. The value of the capo fret location is subtracted from the fret of all the string/fret locations in the MODIFIED NOTE SOURCE FILE 82, and where the fret value is reduced to less than zero, the note is eliminated and the rest of the notes within the block are shifted up to fill the vacated space. For a tuned down E-string, the amount of tune down is equivalent to an increase in fret position to play the note. This increase is just added to all string/fret locations for the lower E-string, similar to how sharps were added. The E-strings are easily located by masking the binary note code in the MODIFIED NOTE SOURCE FILE 82 with 11100000 and exclusively OR'ing with the E-string code of 11000000. A zero result signifies an E-string has been located. Dummy codes are located in the file locations for D♯, D, C♯, and C on the E-string below open E, so when the tune down amount is added to the code it becomes a valid note. For example, D has the code 10111110 so when the fret code is increased by two it becomes 11000000, the code for an open E-string, which is the D note for the tuned down string.

After any necessary adjustments have been made as described above, the MODIFIED NOTE SOURCE FILE 82 is used as the source for notes selected via note input switches 30 in FIG. 1. Each note, after being selected, can be modified for sharp, flat or natural; the sharp and flat modifications were described above in conjunction with the key changes. With reference to FIG. 5, the change to a natural note is done by substituting the note block from the BASIC NOTE SOURCE FILE 81, which only contains natural notes, for the corresponding note block in the SELECTED NOTE FILE 85 which came from the MODIFIED NOTE SOURCE FILE 82 that had earlier been modified to include sharps or flats.

After all the selected notes have been entered, modified as appropriate, and the switch THAT'S ALL 32 in FIG. 1 pressed, the SELECTED NOTE FILE 85 is shifted or copied into a new location in RAM called the ACTIVE NOTE FILE 88 as shown in FIG. 5. A single string/fret location is selected from each note block in the ACTIVE NOTE FILE 88 and written into the NOTE CHOICES FILE 90 as indicated by the arrows 96. This file contains a combination of string/fret locations to play all of the selected notes, and it is screened so as to not contain any combinations that use the same string more than once. The process for selecting the combinations of string/fret locations that are written into the NOTE CHOICES FILE 90 will be described next.

It is desirable to limit the separation between the frets that are used to a distance that can be reached by the fingers of most guitar players. With this in mind, the methods used to choose string/fret location combinations will be described with reference to FIGS. 7 and 8. FIG. 7 illustrates a segment of the ACTIVE NOTE FILE 88 drawn to a larger scale to show how it is constructed. Each note block of four string/fret locations, corresponding to a single note selection, has its string/fret locations ordered from lowest fret to highest fret starting at the top of the block moving to the bottom. Some of the lower spaces within a block may contain zeros as described in conjunction with FIGS. 2 and 3 for the situation where less than four string/fret combinations are available on the guitar to play the note. The lowest string/fret location in each note block contains a natural note played on the 3rd or lower fret, except for note blocks with a note played above the 3rd fret on the first string. These latter notes are characterized by having less than four string/fret locations where they can be played within the range of the fingerboard. It is convenient to file the corresponding string/fret combinations for these higher notes so that the highest fret occurs at the 4th file address in the note block as defined in FIG. 7. With this filing system all the string/fret locations that are played on nearby frets are found in similar areas within the note blocks. The spaces vacated at the tops of the note blocks by moving these higher notes down contain a dummy code 3D. This code, even if modified to account for the use of a capo, a tuned down E-string or change of key will still represent a fret to high that it will be rejected by a subsequent screening process, and therefore effectively ignored. The LOWEST FRET in one note block in the ACTIVE NOTE FILE 88 in FIG. 7 is usually compatible with the LOWEST FRET in any other note block, and possibly with the 2nd LOWEST FRET, but not the 3rd or 4th, from the standpoint of an acceptable separation between frets. Exceptions to this are caused by open strings which will be treated later.

Consider a combination of string/fret locations selected from among the LOWEST FRET and 2nd LOWEST FRET in the note blocks of the ACTIVE NOTE FILE 88 in FIG. 7. This combination can be represented by a binary word where each note block is associated with a distinct bit in the word as shown for the NOTE CHOICE SHIFT REGISTER 110 in FIG. 7. A bit equal to zero signifies the LOWEST FRET in the respective note block is selected, while a bit equal to one signifies the 2nd lowest fret is selected. If this binary word starts with zero and is incremented until a carry occurs into the word bit location one higher than the number of notes, then all combinations of string/fret locations that could be selected from the LOWEST FRET and 2nd LOWEST FRET will have been represented by this word.

This group of combinations is represented by the 1st batch 111 of FIG. 7. To access the spaces in the note blocks associated with one of these combinations, the NOTE CHOICE SHIFT REGISTER 110 is shifted right through carry. If the carry is zero, the LOWEST FRET in the 1st NOTE BLOCK is chosen and moved to the first space in the NOTE CHOICES FILE 90 in FIG. 5. However, if the carry is one, the 2nd LOWEST FRET in the same block is moved instead. For the second string/fret location, the NOTE CHOICE SHIFT REGISTER 110 is shifted right through carry a second time. The LOWEST FRET OR 2nd LOWEST FRET in the 2nd NOTE BLOCK is moved to the second space in the NOTE CHOICES FILE 90 in FIG. 5 for a zero or one in carry respectively. This is repeated for the number of note blocks involved to provide one complete combination of string/fret locations in the NOTE CHOICES FILE 90 in FIG. 5. The next combination is obtained by incrementing the starting value of the NOTE CHOICE SHIFT REGISTER 110 that was used for the last combination and repeating the method described above. This can be repeated until all combinations in the 1st batch 111 have been chosen.

The next group of combinations is represented by the 2ND BATCH 112. It consists of combinations of string/fret locations selected from the 2nd and 3rd spaces in the note blocks in the ACTIVE NOTE FILE 88. The same procedure used for the 1ST BATCH 111 is repeated except the zero and one in carry correspond to the 2ND LOWEST and 3RD LOWEST frets respectively. The 3RD BATCH 113 is accessed by the same procedure except the zero and one in carry correspond to the 3RD LOWEST and 4TH LOWEST frets respectively. At the completion of the combinations in the 3RD BATCH 113, all string/fret location combinations that can readily be played on the guitar fingerboard will have been represented. The first combination of the 2nd and 3rd batches where all the note bits in the NOTE CHOICE SHIFT REGISTER 110 are zero can be eliminated because they are checked by the last combinations of the 1st and 2nd batches respectively where all the note bits are one. If larger reaches were desired, the above process could be repeated with the carry representing a separation between spaces in the noteblocks that is greater than one. However, for the average guitar player this is not necessary, and to check these extra combinations that should later be rejected for excessive separation between frets would only consume more time by the processing electronics. By reducing the number of combinations checked to those that are likely to be useful, which is a small fraction of the total number of combinations possible, around $4^6$ or 4096 for six notes, a substantial ammount of processing time is saved. The number of combinations checked by the methods described is reduced to less than 200. However, additional combinations need to be checked if open string/fret locations are included, as will be described next.

Figure 8:
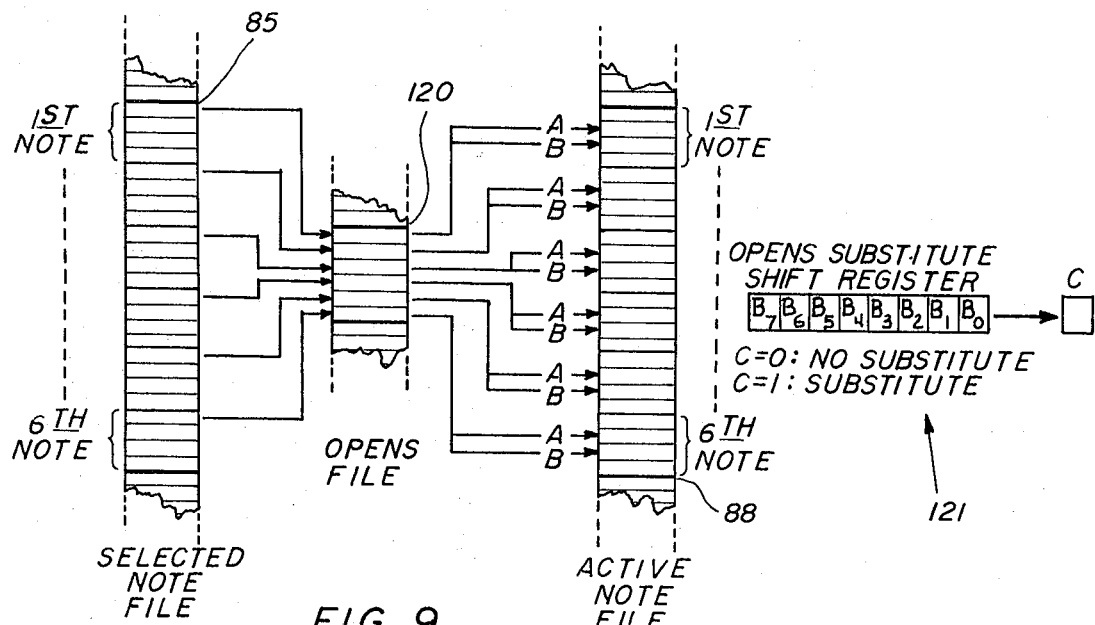
FIG. 8 is a schematic diagram that illustrates an opens file and a method that may be used by the electronic processing circuitry for selecting additional combinations of string and fingerboard locations that may be useful when one or more notes can be played on an open string.

FIG. 8 illustrates the method used for checking additional string/fret combinations when open strings are used. They are played without being pressed down by a finger so they cause no reach problems even if used with string/fret locations selected from the highest frets of other note blocks. Open strings are characterized by the fret code being equal to zero. Since this is the lowest possible code for the fret, they are always located in the first space of the respective note block. The OPENS FILE 120 is made from the contents of these first spaces in the note blocks. It is formed as illustrated in FIG. 8, by filing open strings in their repective locations in the OPENS FILE 120, and rejecting the string/fret location in the first spaces of the note blocks that are not open, and filing zerios in their respective locations in the OPENS FILE 120. This file is then used for substituting open strings into the note block spaces for the 2ND BATCH 112 and 3RD BATCH 113 as designated by locations A and B respectively in the ACTIVE NOTE FILE 88 in FIG. 8. The 1ST BATCH 111 inherently includes these open strings so no substitution is needed there. The substitution procedure is performed after the 2ND BATCH 112 has been completed and then again after the 3RD BATCH 113 has been completed, as defined in FIG. 7. A register named the OPENS SUBSTITUTE SHIFT REGISTER 121 in FIG. 8 is used for controlling the substitutions. The first bit of this register corresponds to the first open string in the opens file, the second bit to the second open string and so forth. These bits are initially set to one which results in the first combination of string/fret locations including all the open strings that are available. For any subsequent combination, the OPENS SUBSTITUTE SHIFT REGISTER 121 is decremented by one from the preceeding value. This is continued until it reaches zero, at which time the procedure is complete and all combinations have been checked. The substitutions are made by shifting the OPENS SUBSTITUTE SHIFT REGISTER 121 right through carry, and if a one is in carry, then the next open string in the OPENS FILE 120 is substituted into the corresponding location of the ACTIVE NOTE FILE 88; if a zero is in carry then no substitutiion is made. For each combination of open strings, the procedure 2ND BATCH 112 or 3RD BATCH 113 in FIG. 7 is repeated, for substitutions that went into locations A and B respectively. However, not all combinations selected in this manner have open strings. For example, when an open string is substituted in location A for the 2ND BATCH 112, this open string will only be selected when its respective bit in the NOTE CHOICE SHIFT REGISTER 110 in FIG. 7 is zero and not a one. To avoid processing these combinations without open strings (which are redundant because they are also selected during 2ND BATCH 112 or 3RD BATCH), the selected combinations are checked to assure they contain an open string and if not they are rejected and a new combination selected. A further check for two or more open strings when they are included in the OPENS SUBSTITUTE SHIFT RESISTER 121 is not performed because it was not considered worth while to correct this minor redundancy since the operator of the device can choose to ignore any repeated combinations which only rarely occur. However, this additional check could be accomplished by counting the bits that equal one when they are shifted out of the OPENS SUBSTITUTE SHIFT REGISTER 121. The total count signifies the number of open strings that should be used. The selected string/fret location combinations could than be checked for the number of open strings used, and if the number is not the same the combination would be rejected. Since more than one or two opens are seldom used, this is not a significant concern.

The additional processing time consumed by the substitution procedures for open strings is typically small because more than two open strings are not frequently used. When there are two open strings, there are only three combinations to check using the OPENS SUBSTITUTE SHIFT REGISTER 121 (00000011, 00000010, and 00000001). This results in repeating 2ND BATCH 112 and 3RD BATCH 113 in FIG. 7 three times each, and then rejecting many of the combinations early for not containing open strings, as described above. This could add as many as several hundred string/fret location combinations to process, which is still a small number compared to the maximum total number of combinations possible. It is desirable to avoid processing excessive combinations that could cause an inconvenient delay for the operator of the device. With the procedures described above, this has not been found to be a problem. The above procedures also facilitate increasing the average fret position by simply moving from the 1ST to 2ND or 2ND to 3RD BATCHES 111-113 in response to switch HIGHER POSITION 40 shown in FIG. 1.

After a combination of string/fret locations has been selected, finger numbers are assigned. The finger numbers used to play the notes increase as the fret numbers increase, and for multiple notes on the same fret, the finger numbers increase as the string numbers decrease. The same rules apply when bars are used, except for the notes of the bar that use the same finger. In preparation for the methods used to assign finger numbers to the string/fret locations, the contents of the NOTE CHOICES FILE 90 of FIG. 5 are moved to a new file designated the ORDERED NOTE FILE 125-127 in FIG. 9. The string/fret locations are re-arranged for this file to be in the same sequence just described for increasing finger numbers. If any open strings are included they are filed at the start of the sequence and are processed separately since no finger numbers are assigned to them.

Figure 9:
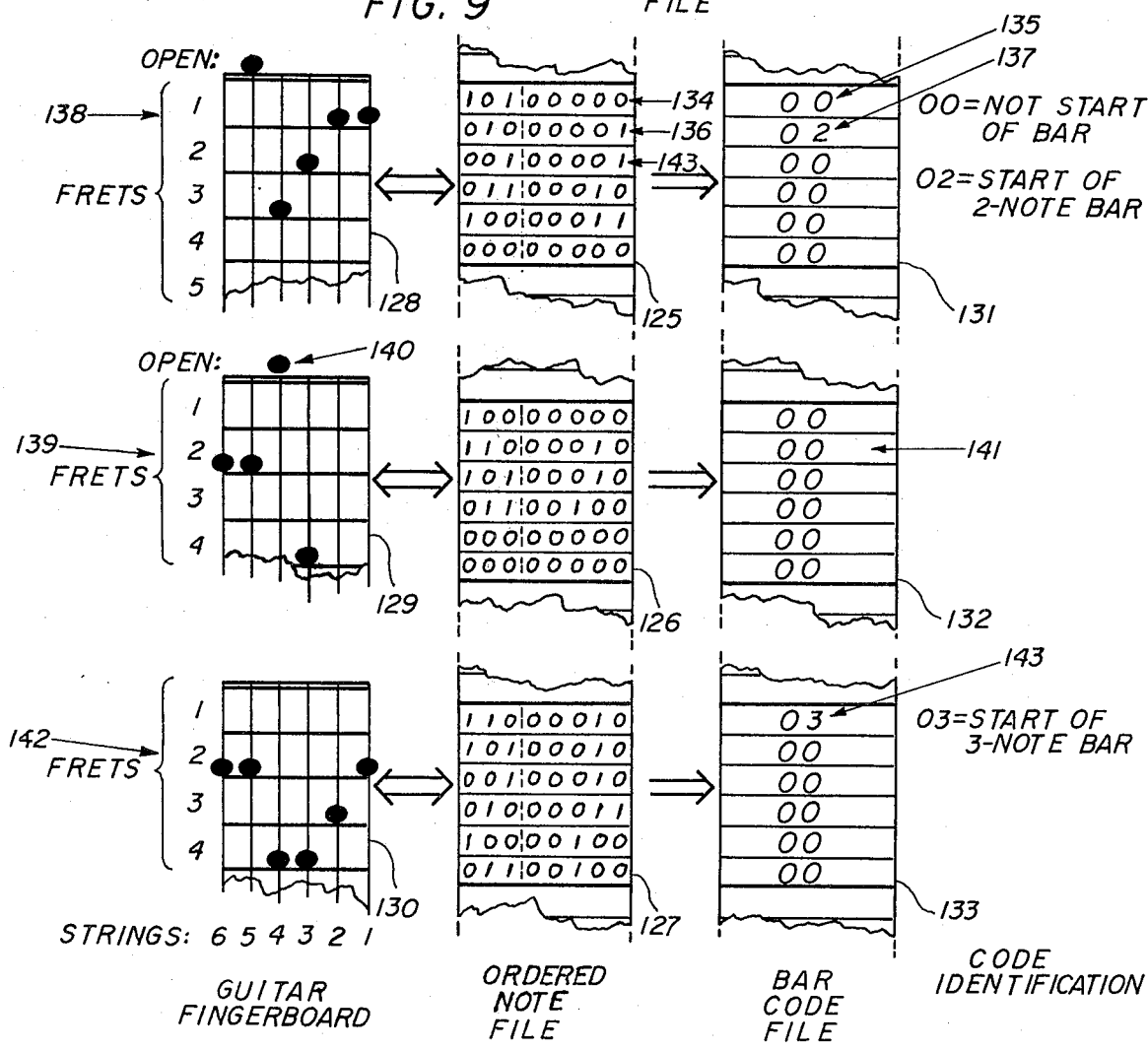
FIG. 9 is a schematic diagram that illustrates how a bar code file may be constructed by the electronic processing circuitry for use with the methods that may be used for assigning finger numbers to string and fingerboard locations.

After the ORDERED NOTE FILE 125-127 in FIG. 9 is ready, a coding process is done to facilitate the assignment of fingers when a bar is used. A bar is defined broadly herein as any combination of string/fret locations where the strings for two or more notes can be pressed against the fingerboard at the same fret with the same finger. If is feasible to use more than one bar with a single combination of string/fret locations. FIG. 9 illustrates three examples of string/fret location combinations on GUITAR FINGERBOARDS 128-130 for use in describing the coding process for bars. The contents of the ORDERED NOTE FILES 125-127 correspond to the first combinations that would be selected by the 1ST BATCH 111 in FIG. 7. These combinations lead to the codes shown in the BAR CODE FILES 131-133 which will now be explained.

The bar code identified whether or not its respective string/fret location is the start of a bar, and if it is, its code is the number of notes played on the bar, otherwise its code is 00 (hexadecimal). The upper example in FIG. 9 shows that the first string/fret location 134 in the ORDERED NOTE FILE 124 is not the start of a bar. This is because it is played with an open string and doesn't use a finger so by definition it can't be the start of a bar. It is therefore coded 00 135 in the BAR CODE FILE 131. The code associated with the 2nd string/fret location 136 is 02 137 in the BAR CODE FILE 131, which indicates that it is the start of a bar that has two notes. This is evident from inspection of the upper GUITAR FINGERBOARD 128 in FIG. 9 where it can be seen that these two notes 138 meet the criteria for a bar as defined above. None of the remaining string/fret locations could be the start of a bar and this is indicated by their respective bar codes being 00.

In the middle example of FIG. 9, the string/fret locations 138 on the 2nd fret of strings 6 and 5 of the GUITAR FINGER BOARD 129 appear as a candidate for a bar. However, the 4th string is played open 140 and this makes it difficult to use a single finger to press down both the 6th and 5th strings, because it is difficult to reach over and not touch a string played adjacent to a bar. For this reason the bar code for these string/fret locations 141 is coded 00 for no bar. The procedures followed for rejecting potential bars is:

(1) Check for another string that is used, is located between the highest and lowest strings of the potential bar, and is not part of the bar. If one is found and it is on a lower fret then the potential bar is not allowed. If it is on a higher fret the bar is allowed.

(2) Check the string with the next lower number than is included in the potential bar. If it is used at a lower fret the potential bar is not allowed. If it is used at a higher fret, the bar is allowed. If it is not used at all, the potential bar is allowed because it is not very difficult to reach over the unused string to play the bar since it is alright if the unused string is touched.

The latter criteria for rejecting potential bars was selected to retain most of the potential bars that can be played by an intermediate guitar player without too much difficulty. This criteria is an option of the preferred embodiment of this invention which can be modified to correspond to the degree of difficulty desired. For example, all potential bars that satisfy the first criteria could be allowed independent of the second criteria to accomodate advanced players. Or, the second criteria could be expanded to include lower numbered frets on any lower numbered string instead of just the next lower numbered string, to accomodate beginning players. The option used with the preferred embodiment is a compromise and if a beginning player sees a bar he can not play, he has the option to choose another fingering or string combination, since this is easily accomplished by using the display change switches 37-41 shown in FIG. 1.

In the lower example of FIG. 9, the note 142 on the 2nd fret of the 6th string is the start of a bar with 3 notes. This is shown in the corresponding location 143 in the BAR CODE FILE 133. None of the rest of the notes are the start of a bar as shown by the remaining 00 codes. The reason for forming the BAR CODE FILES 131-133 as described for these examples will be explained in the following descriptions where the methods for assigning finger numbers to the string/fret locations will be described.

Figure 10:
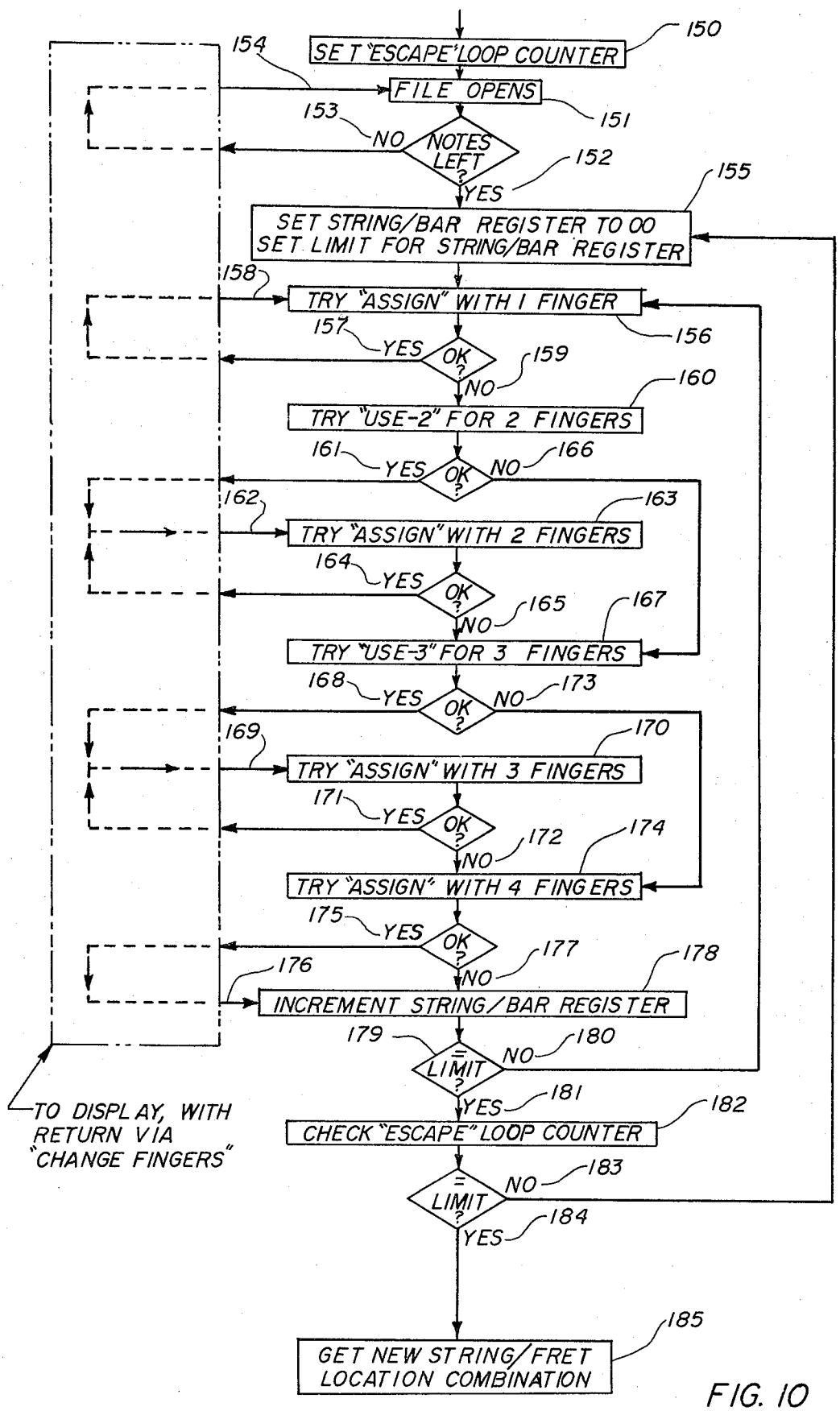
FIG. 10 is a flow diagram that further defines the major processing steps that may be used by the electronic processing circuitry to assign fingers to notes as referenced in FIG. 4.

FIG. 10 is a flow diagram that illustrates the major steps used to assign finger numbers to the string/fret location combinations that were selected by the preceeding methods. An escape loop counter is set 150 to prevent an endless search for a combination of fingers to use if none exists. Next, all open strings are filed 151 for later display; no finger numbers are assigned to open strings. If there are still more string/fret locations left 152, then the process of assigning fingers begins. Otherwise the display mode is entered 153. A return from display 154 via switches CHANGE DISPLAY 37 and CHANGE FINGERS 38, as shown in FIG. 1, causes a repeat of the same display since there are no finger numbers to change. For brevity in the following descriptions, a return from display using these switches is refered to as a return via "CHANGE FINGERS".

A register called the STRING/BAR SHIFT REGISTER 190 in FIG. 12, to be described in more detail later, is used to indicate whether a string/fret location being processed will be treated singly or as the start of a bar. This register is initially set to 00 155, which signifies no bar is to be used. The first finger assignment tried is with one finger 156. Without a bar, this can only be successful if there is only one unopen string/fret location. If successful 157, a finger number is assigned to the single string/fret location and the display mode entered. If the operator later returns via "CHANGE FINGERS" 158 a different finger number is assigned and the display mode reentered.

If more than one unopen string/fret location is present, "Assign" with one finger 156 is not successful 159 (without a bar) and "Use-2" is tried 160. It is used for assigning two fingers. If successful 161, the display mode is entered as above. If the operator later returns via "CHANGE FINGERS" 162, a different combination of two finger numbers is tried by "Assign" with 2 fingers 163. If successful 164, the display mode is entered. Returns via "CHANGE FINGERS" 162 repeats "Assign" with 2 fingers 163. When this is not successful 165, or if "Use-2" is not successful 166, the fingering procedures move on to "Use-3" 167, which is used for assigning 3 fingers. If successful 168, the display mode is entered and a subsequent return via "CHANGE FINGERS" 169 attempts to assign a different combination of 3 fingers via "Assign" with 3 fingers 170. If successful 171, the display mode is entered. A return via "CHANGE FINGERS" 169 repeats "Assign" with 3 fingers 170. When this is not successful 172, or if "Use-3" is not successful 173, the fingering procedures move on to "Assign" with 4 fingers 174, which is used for assigning 4 fingers. If successful 175 the display mode is entered. A return via "CHANGE FINGERS" 176 does not produce a different combination of 4 fingers; there is only one combination of 4 out of 4 numbered from low to high. If "Assign" with 4 fingers 174 is not successful 177, or if there is a return from display via "CHANGE FINGERS" 176 the fingering procedure continues by incrementing the STRING/BAR SHIFT REGISTER 178 and checking if all values have been checked 179. If they have not 180, the procedure returns to "Assign" with one finger 156 to repeat all the steps from there with a different value in the STRING/BAR SHIFT REGISTER 190 shown in FIG. 12. If all values have been checked 181, the escape loop counter is checked 182. If it has not reached its limit 183, the STRING/BAR SHIFT REGISTER 190 is reset to 00 155 and all the steps from "Assign" with one finger 156 can be repeated. If the escape loop counter has reached its limit 184 a new string/fret location combination is automatically selected 185 and the procedures described above started from the beginning.

If, during the above procedure, a return from the display mode occurs by the operator pressing switches CHANGE DISPLAY 37 and USE BAR 41 in FIG. 1, the STRING/BAR SHIFT REGISTER 190 in FIG. 12 is incremented to begin the search for a bar and the above steps starting with "Assign" with one finger 156 repeated. A flag is set that inhibits entering the display mode unless a bar is being displayed. If no bar is found, a finger assignment previously shown without a bar is repeated.

The escape loop counter 150 can be set to allow the operator to cycle through all the fingering combinations a few times before a new string/fret location combination is automatically selected. This has been found to be a useful feature. An initial setting of three has been found to be satisfactory. A similar escape loop is used for selecting string/fret location combinations, and an initial setting of three is used there also. An escape from the procedures of selecting string/fret location combinations, however, goes to the display mode and shows all six strings played open as a signal to the operator to make a new note selection.

FIGS. 11, 12 and 13 illustrate how the "Assign" procedure referenced in FIG. 10 is used to make finger assignments. The "Use-2" 160 and "Use-3" 167 procedures also referenced in FIG. 10 will be subsequently described. FIG. 11 shows the flow diagram for "Assign". FIG. 12 illustrates how shift registers are used to govern the finger and string/bar combinations used in "Assign", much like shift registers were used and described for FIGS. 7 and 8. FIG. 13 shows the various sequences of finger combinations that are used in "Assign".

Assume that the ORDERED NOTE FILE 125-127 described in conjunction with FIG. 9 contains one unopen string/fret location, "Assign" with one finger 156 in FIG. 10 is about to begin, and the STRING/BAR SHIFT REGISTER 190 of FIG. 12 is set to 00 for no bar. The top space 191 in the FINGER COMBINATIONS FILE 192 of FIG. 13 is selected for the first finger combination to try. The first finger combination 193 used in FIG. 11 for one finger is represented by the code 01. This code is entered into the FINGER COMBINATION SHIFT REGISTER 194 of FIG. 12 for use in the "Assign" procedure per FIG. 11 (the codes shown in FIG. 12 are for another example which will be subsequently described). To check if a finger is needed 195, the FINGER COMBINATION SHIFT REGISTER 194 in FIG. 12 is shifted one time to the right through carry. A one in carry signifies that finger number one is to be assigned 196 to either the first unopen string/fret location or else a bar, depending on the contents of the STRING/BAR SHIFT REGISTER 190 in FIG. 12. To check if a bar is needed 197, this register is shifted right through carry. A zero is produced in carry for this example since the initial value in the register was 00. The zero signifies that no bar is to be assigned 198 to finger number one. Consequently, the first finger is assigned 199 to only the first string/fret location contained in the ORDERED NOTE FILE 125-127 in FIG. 9. A check is made to determine if there are enough notes for the assignment 200, and there are since one was available 201 ("note" is used interchangably here for "string/fret location" for brevity). Next, a check is made to determine if all fingers have been tried for assignment 202. Since there are four fingers to check, and only one has been checked so far, the answer is no 203 and the procedure returns to check if another finger is needed 195. Another shift of the FINGER COMBINATION SHIFT REGISTER 194 in FIG. 12 shows that the 2nd bit in carry is a zero for no finger to be assigned 204. Again a check if all fingers have been tried is made 202, and again the answer is no 203, so the procedure loops back up to check if the next finger is to be used 195. This shift checks the 3rd bit which again is zero 204 so the procedure loops down 202 and then back up 195 to check the 4th finger. The next bit is zero 204 so the procedure loops down to check if all fingers have been tried 202. They have 205, so this time a check is made to determine if all notes have bee used 206. They have 207, so the display mode is entered 208. A return from display 209 for a change of fingers first checks if there are more combinations left for the same number of fingers 210. For this example there are 211, since there are three more combinations to try for one finger, as shown by FIG. 13 in the FINGER COMBINATIONS FILE 192 for 1 finger. The three codes remaining are 02, 04 and 08, which correspond to the 2nd, 3rd, and 4th bits for finger numbers 2,3 and 4 respectively.

Assume that the operator returned from the display mode three times via "Change Fingers", codes 02 and 04 were processed as just described, and now code 08 (00001000 binary) is to be used for the finger combination 193 in FIG. 11. There is still just one unopen string/fret location in the ORDERED NOTE FILE 125-127 in FIG. 9 and the STRING/BAR SHIFT REGISTER 190 in FIG. 12 is still set for 00 for no bar. Returning to FIG. 11, to check if a finger is needed 195, the FINGER COMBINATION SHIFT REGISTER 194 is shifted one time to the right through carry. A zero in carry signifies that finger number one is not to be assigned 204 so the procedure loops down to check if all fingers have been tried 202. The haven't 203 since only the first of four has been checked. The procedure loops back up to check if the second finger is to be assigned 195. Again a zero is shifted into the carry so finger number two is not assigned 204 and the procedure loops down to check if all fingers have been tried 202.

They haven't 203 so the procedure loops back to check if the third finger is to be assigned 195. Again a zero is shifted into carry so finger number three is not assigned 204 and the procedure loops down to check if all fingers have been tried 202. The haven't 203 so the procedure loops back up to check if the fourth finger is to be assigned 195. A one is shifted into carry this time which signifies that finger number four is to be assigned 196 to either the first unopen string/fret location or else a bar, depending on the contents of the STRING/BAR REGISTER 190. When this register is shifted right through carry 197, a zero is produced in carry which signifies that no bar 198 is to be assigned to finger number four. Consequently, the fourth finger is assigned 199 to the only string/fret location contained in the ORDERED NOTE FILE 125-127 in FIG. 9. A check is made to determine if there are enough notes for the assignment 200, and there are 201 since one was available. Next, a check is made to determine if all fingers have been tried 202 and the have 205, since the fourth was just checked. A check is then made to determine if all notes have been used 206 and they have, so the display mode is entered 208.

Following a return from the display mode 209 via "Change Fingers", a check if finger combinations are left 210 produces a "no" 212 since all four combinations have been checked, so "Assign" with one finger is done. Referring to FIG. 10, this corresponds to not being "OK" to use "Assign" with 1 finger 159, so that procedure would move down to try "Use-2" for 2 fingers 160. All the attempts to use more that one finger would fail, since there is only one unopen note for this example. The procedure of FIG. 10 would eventually loop back up until it again arrived at try "Assign" with 1 finger 156, and the process just described in conjunction with FIGS. 11, 12 and 13 would be repeated.

Attempts to assign more fingers than there are notes available could be avoided by early screening. However, this is not necessary because the processing time lost in making these unsuccessful attempts is small, since in most cases a single pass through the flow diagram of FIG. 10 will find a valid finger combination. This is a different situation from that described for selecting finger combinations, where the processing time could be significant if thousands of unnecessary combinations were involved.

As a final example of "Assign", consider a more complex situation where the codes are as shown in FIG. 12 for the FINGER COMBINATION SHIFT REGISTER 194 and the STRING/BAR SHIFT REGISTER 190. Also assume that the ORDERED NOTE FILE 125 and BAR CODE FILE 131 of FIG. 9 have the data shown in the top example, and the open fifth string note has been filed 151 per FIG. 10. Returning to FIG. 11 with these initial conditions, the first check if a finger is needed 195 by shifting the FINGER COMBINATION SHIFT REGISTER 194 right through carry, produces a one in carry indicating that a finger is needed 196. Next, the STRING/BAR SHIFT REGISTER 190 is shifted right through carry 197 and a one in carry indicates that a bar is needed 213. The contents of the BAR CODE FILE 137 in FIG. 9, associated with this first unopen string/fret location which is at the second file space since the first string/fret location was open and filed without a finger being assigned, is checked 214. The bar code is 02 which is not zero 215, so the first finger is assigned to the bar 199. The bar has two notes, as indicated by its code, so the first finger is assigned to the first two unopen notes 136 and 143 in the ORDERED NOTE FILE 125 in FIG. 9. A check is made to determine if there are enough notes for the assignment 200, and there are 201 since five were available and three have been used. A check is made to determine if all fingers have been tried 202 and they haven't since only the first of four have been tried 203. The procedure loops back up to check if the second finger is needed 195 and it is 196, as indicated by a one in carry when the FINGER COMBINATION SHIFT REGISTER 194 is shifted right through carry a second time. A check is made to determine if a bar is needed 197 and it isn't 198, as indicated by a zero in carry when the STRING/BAR SHIFT REGISTER 190 is shifted right through carry a second time. Finger number 2 is then assigned 199 to the fourth note in the ORDERED NOTE FILE 125 in FIG. 9. A check is made to determine if there are enough notes 200, and there are 201 since this is the fourth of five. A check is made to determine if all fingers have been tried 202, and they haven't 203 since this is the second of four. The procedure loops back up to check if the third finger is needed 195 and it is 196, as indicated by a one in carry when the FINGER COMBINATION SHIFT REGISTER 194 is shifted right through carry a third time. A check is made to determine if a bar is needed 197 and it isn't 198 as indicated by a zero in carry when the STRING/BAR SHIFT REGISTER 190 is shifted right through carry a third time. Finger number 3 is then assigned 199 to the fifth note in the ORDERED NOTE FILE 125 in FIG. 9. A check is made to determine if there are enough notes 200 and there are 201 since this is the fifth of five. A check is made to determine if all fingers have been tried 202, and they haven't 203 since this is the third of four. The procedure loops back up to check if the fourth finger is needed 195 and it isn't 204, as indicated by a zero in carry when the FINGER COMBINATION SHIFT REGISTER 194 is shifted right through carry a fourth time. The procedure loops down to check if all fingers have been tried 202 and they have 205. A check is made to determine if all notes have been used 206 and they have 207 so the display mode is entered 208. FIG. 14 illustrates the resultant finger assignment that is displayed when the display mode is entered. The encircled numbers 220-223 indicate where the fingers should be placed. The encircled zero 224 indicates an open string that should be played.

Figure 15:
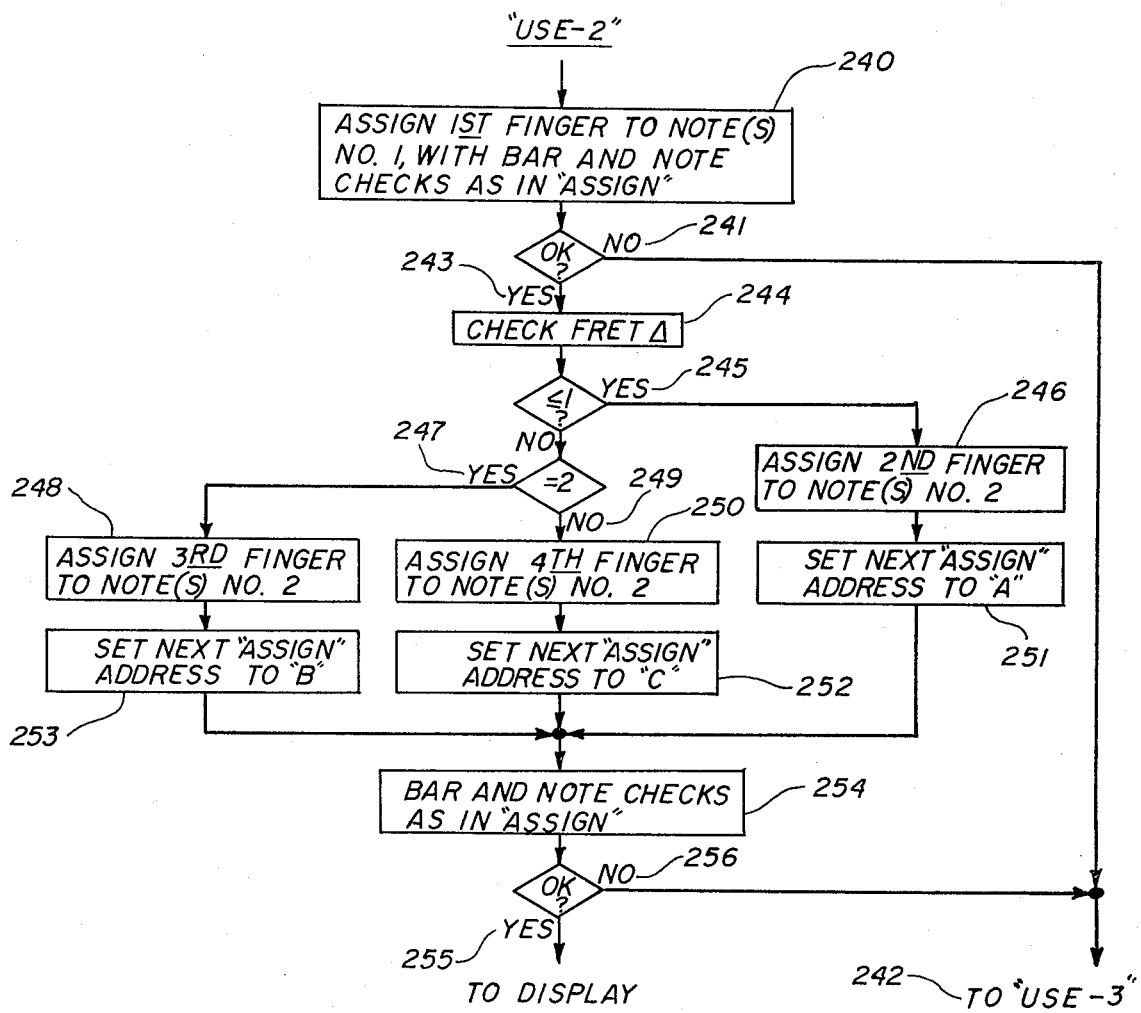
FIGS. 15 and 16 are flow diagrams that further define the processing steps that may be used by the electronic processing circuitry to perform the "Use-2" and "Use-3" processes respectively referenced in FIG. 10.
Figure 16:
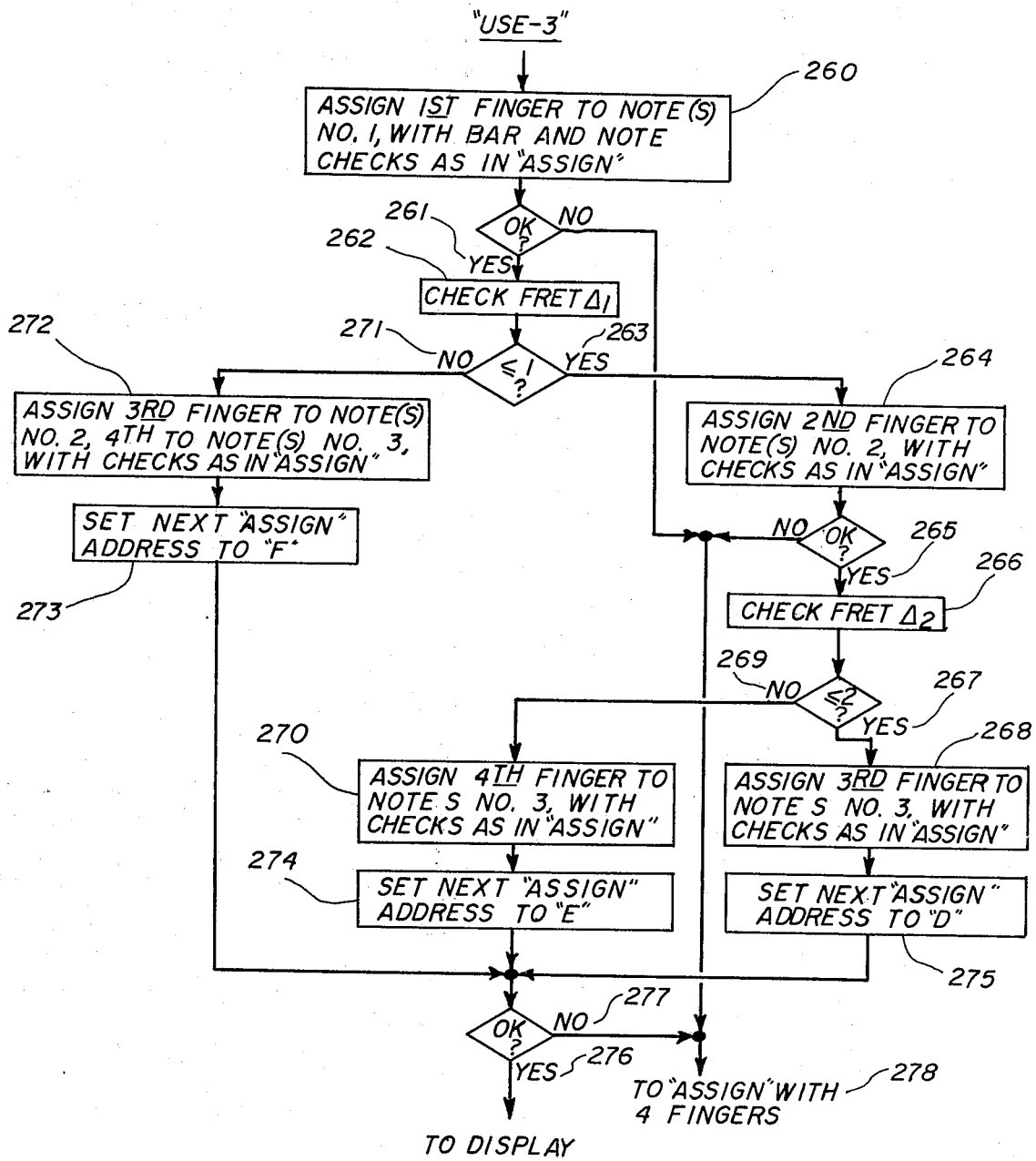

The FINGER COMBINATIONS FILE 192 illustrated in FIG. 13 includes three groups 230-232 of six finger combinations that could be used when 2 fingers are to be assigned. The individual finger combinations within the groups are the same, but they are arranged in different sequences. The particular group to be used depends upon the spacing between the frets associated with the string/fret locations in the ORDERED NOTE FILE 125-127 in FIG. 9. Six combinations are derived from two fingers taken from a total of four, where the finger numbers within a group are numbered from low to high: 1-2, 1-3, 1-4, 2-3, 2-4 and 3-4. When 3 fingers are to be assigned there are three groups 233-235 of four finger combinations: 1-2-3, 1-2-4, 1-3-4 and 2-3-4. The reason that different sequence options are available is to allow a sequence to be selected where the first combination is generally the most favorable to the operator based upon the spacing between the frets that will be used. The most favorable sequence to use is selected by the procedures "Use-2" as illustrated in FIG. 15 or "Use-3" as illustrated in FIG. 16, depending on whether two or three fingers are assigned respectively. Once the sequence is so started, the remaining combinations are used by the "Assign" procedure, as shown by FIG. 10.

"Use-2", as shown in FIG. 15, assigns the first finger to the first string/fret location or bar 240 depending on the contents of the STRING/BAR SHIFT REGISTER 190 in FIG. 12, as already described. The same checks are then made as described for "Assign" to assure there are enough notes and that there are more fingers to assign, as described for FIG. 11. A negative result 241 terminates "Use-2" and causes the procedure to move on to "Use-3" 242. However, if the results of these checks are positive 243, the space between the frets for the first and second finger assignments is checked 244. This space is refered to as the fret Δ 225 as illustrated in FIG. 14. If the fret Δ is less than or equal to one 245, the 2nd finger is assigned 246 to the second string/fret location or bar depending on the contents of the STRING/BAR SHIFT REGISTER 190 in FIG. 12. However, if the fret Δ is 2 247, the 3rd finger is assigned 248, and if the fret Δ is greater than 2 249 the 4th finger is assigned 250. In conjunction with these finger assignments, the address holding the next finger combination to be assigned, designated as A, B, or C respectively in FIG. 13, is written into the address pointer 251-253 for the next finger combination to use for "Assign" with 2 fingers 163 in FIG. 10. After the assignment with the last finger, and the setting of the address pointer for the next finger combination, further checks 254 are made to assure there are enough notes and fingers, and all notes have been used. If these results are positive, 255 the display mode is entered. If not 256, or if the results of the similar checks for the first finger assignment were negative 241, the procedure continues on to "Use-3" 242. If the display mode were entered, then a return via "CHANGE FINGERS" would proceed to "Assign" with the fingers 163 according to FIG. 10, with the first finger combination indicated by A, B or C according to FIG. 13 as already described.

"Use-3", as shown in FIG. 16 assigns the first finger to the first string/fret location or bar 260 depending upon the contents of the STRING/BAR SHIFT REGISTER 190 in FIG. 12. The same checks are then made 260 as described for "Assign" to assure there are enough notes and that there are more fingers to assign as described for FIG. 11. If the results of these checks are positive 261, the space between the frets for the first and second finger assignments is checked 262. If the first fret Δ is less than or equal to one 263 the second finger is assigned to the second string/fret location or bar 264 depending on the contents of the STRING/BAR SHIFT REGISTER 190 in FIG. 12 and the note and finger checks of "Assign" are repeated. If the results are positive 265, the space between the frets for the second and third finger assignments is then checked 266. If this second fret Δ is less than or equal to 2 267, the third finger is assigned to the third string/fret location or bar 268 depending on the contents of the STRING/BAR SHIFT REGISTER 190 in FIG. 12.

However, if the second fret Δ is greater than 2 269, the fourth finger is assigned instead 270.

When the first fret Δ is checked 262, a value greater than one 271 would have resulted in the assignment of the third finger to the second string/fret location or bar and the fourth finger to the third string/fret location or bar 272. In conjunction with these final finger assignments 268, 270 and 272, the address holding the next finger combination to be assigned, designated D, E or F respectively in FIG. 13, is written into the address pointer 273, 274 and 275 for the next finger combination to use for "Assign" with 3 fingers. If the final checks are positive 276, for enough notes and fingers and all notes used, the display mode is entered. If not 277, or if the results of the semilar checks performed earlier were negative, the procedure continues to "Assign" with 4 fingers 278 which has the finger combination code 00001111 236 as shown in FIG. 13. If the display mode were entered instead, then a return via "CHANGE FINGERS" would proceed to "Assign" with 3 fingers 170, according to FIG. 10 with the next finger combination indicated by D, E, or F according to FIG. 13 as already described.

The finger numbers are coded in standard binary, as were the string numbers and fret Δ numbers. This coded information is output by the electronic processing circuitry for controlling the visual display, as described in conjunction with FIGS. 1, 2 and 3.

The preferred embodiment is for use by guitar playing enthusiasts who will find the front panel 10 shown in FIG. 1 a convenient means for entering their note selections and adapting the note translation device to the structure of the musical compositions they wish to play. However, numerous other methods of entering note code information is also possible with this invention. For example, suppose that a publisher of music used coded note information for musical compositions in the course of publishing or printing music for distribution, independent of this invention. This same code could be processed by this invention to provide the publisher with the necessary information for him to publish instructions for playing the same music on a stringed fingerboard instrument. To facilitate publication, hard copy could be obtained by operating specially designed printing equipment responsive to the coded output information produced by this invention. Perhaps a combination of a visual display as described herein, and a printer would be advantageous, with a skilled musician observing the choices displayed by this invention via the display and change controls, and then actuating the printer when he has decided which of the playing combinations is most appropriate.

Other options will become apparent to those skilled in the art once they have read this disclosure, such as installing the displays of the preferred embodiment directly on the guitar fingerboard. The operator would then place his fingers directly on the strings above the displayed finger numbers. These and other embodiments are all within the scope of the present invention. While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A note translation device for translating selected note symbols shown in printed music to string and fingerboard location information to use for playing the notes on a stringed fingerboard instrument, comprising:

a support structure;

a keyboard switch array supported by said support structure and including a plurality of musical note switch means corresponding to a plurality of printed music note symbols and selectively operable to enable the operator to input selected note symbols shown in the printed music;

electronic processing circuitry means responsive to said musical note switch means for storing said selected note symbols that correspond to note symbols shown in the printed music, said electronic processing circuit means further adapted for choosing string and fingerboard location information for playing said selected note symbols thereby translating the note symbols shown in the printed music into string and fingerboard locations to use for playing the notes of a stringed fingerboard instrument, and means for communicating to the operator said string and fingerboard location information selected by said electronic processing circuit means whereby the string number and fingerboard location is identified for playing each selected note symbol on said stringed fingerboard instrument.

2. The note translation device of claim 1 wherein said musical note switch means are arranged in locations corresponding to a graphical representation of said printed music note symbols.

3. The note translation device of claim 2 wherein said graphical representation of said printed music note symbols comprises at least one musical staff with a plurality of printed music note symbols illustrated thereon and the locations for actuating said musical note switch means are indicated by the locations of said printed music note symbols.

4. The note translation device in claim 1 wherein said means for communicating said string and fingerboard location information comprises a graphical representation of at least a segment of the fingerboard of said stringed fingerboard instrument, said graphical representation including visual indication means responsive to said string and fingerboard location information and adapted to indicate the locations for pressing the strings on said stringed fingerboard instrument for playing said selected note symbols.

5. The note translation device in claim 4 wherein the visual indication means comprises a plurality of groups of visual indicators, wherein the visual indicators within each group are arranged in aline that is substantially in alignment with a string representation on said fingerboard graphical representation, and the location of each of said indicators along the string representation indicates the finger location for pressing the string for playing a selected note symbol when said visual indicator is activated.

6. The note translation device in claim 1 wherein said keyboard switch array further includes key changing switch means for adjusting said electronic processing circuitry means to choose string and fingerboard location information that is modified to account for musical key signatures different from the key of C.

7. The note translation device in claim 1 wherein said keyboard switch array further includes open string adjustment switch means for adjusting said electronic processing circuitry means to choose string and fingerboard information corresponding to said instrument having a change to the open-tuned pitch of at least one string, and said electronic processing circuitry means is adapted to be responsive to said open string adjustment switch means so as to modify the string and fingerboard locations chosen to account for said pitch-changed string.

8. The note translation device in claim 1 wherein said keyboard switch array further includes pitch changing switch means for adjusting said electronic processing circuitry means to choose string and fingerboard information corresponding to said instrument having a capo installed on said fingerboard, and said electronic processing circuitry means is adapted to be responsive to said pitch changing switch means so as to modify the string and fingerboard locations chosen to account for said capo.

9. The note translation device in claim 1 wherein said keyboard switch array further includes individual note symbol changing switch means for adjusting said electronic processing circuitry means to choose string and fingerboard information that is modified to account for a change to at least one printed music note symbol that is accompanied by an accidental selected from the group that includes sharps, flats and naturals, and said electronic processing circuitry means is adapted to be responsive to said pitch changing switch means so as to account for said selected accidental.

10. The note translation device in claim 1 wherein said keyboard switch array further includes string changing switch means for redirecting said electronic processing circuitry means to choose alternate string and fingerboard information for playing said selected note symbols on the fingerboard of said instrument, and said electronic processing circuitry means is adapted to be responsive to said string changing switch means so as to choose alternate string and fingerboard information.

11. The note translation device in claim 1 wherein said keyboard switch array further includes higher position switch means for redirecting said electronic processing circuitry means to choose alternate string and fingerboard location information characterized by the average location of the fingerboard moving away from the nut by a distance corresponding to at least one full musical pitch step, whereby said selected note symbols are played at a generally higher position on said fingerboard, and said electronic processing circuitry means is adapted to be responsive to said individual higher position switch means so as to choose fingerboard locations in a substantially higher position on said fingerboard.

12. The note translation device in claim 1 wherein the electronic processing circuitry means is further adapted for assigning finger numbers to use for playing said selected note symbols identified by said string and fingerboard location information chosen by said note translation device.

13. The note translation device in claim 5 and further including additional electronic processing circuitry means for assigning finger numbers to use for playing said selected note symbols identified by said string and fingerboard location information, and said visual indicators are adapted to display said chosen finger numbers at their respective locations along said string representations shown on said graphical fingerboard representation.

14. The note translation device in claim 5 wherein the visual indication means further includes fingerboard location indication means to indicate the relationship of the first fingerboard position shown on the graphical representation of the display to the location to use for playing the notes on the actual fingerboard of the instrument, whereby the segment of the guitar fingerboard shown by said graphical representation may correspond to a segment of the instrument fingerboard located away from the nut by an amount shown by said fingerboard location indication means.

15. A note translation device for translating note symbols shown in printed music to string and fingerboard locations for playing selected note symbols on a stringed fingerboard instrument, comprising:
a keyboard switch array having a plurality of selectively operable switch means;
a first group of said switch means for modifying the translation of selected note symbols shown in said printed music;
a second group of said switch means for entering said selected note symbols;
electronic processing circuitry means responsive to said second group of switch means and adatped to format and store coded words representative of said entered selected note symbols that correspond to note symbols shown in the printed music, said electronic processing circuitry further adapted to modify the information contained in the format of said coded words in response to said first group of switch means to correspond to printed music that includes at least one modification taken from the group that includes a change of key, a change in tuning for at least one open string, and the use of a capo to change the effective nut location, said electronic processing means further adapted for choosing strings and fingerboard locations corresponding to said stored coded words thereby translating the note symbols shown in the printed music into string and fingerboard location information to use for playing the notes on a stringed fingerboard instrument and said electronic processing means still further adapted for outputting coded signals representative of said strings and fingerboard locations;
visual display means responsive to said string and fingerboard location coded signals whereby visual indicator means identify the strings and fingerboard locations for placing fingers for playing said selected note symbols on said stringed fingerboard instrument;
a third group of one or more of said switch means for modifying the string and fingerboard locations shown by said visual display;
said electronic processing means adapted to respond to said third group of switch means for choosing another combination of string and fingerboard locations whereby a different option for playing said selected note symbols may be shown on said display.

16. The note translation device of claim 15 and further including:
a fourth group of said switch means for changing individual selected note symbols, and
said electronic processing circuitry is responsive to said fourth group of switch means and is interactively adapted to modify the coded word for said individual selected note symbol to correspond to at least one musical accidental taken from the group that includes sharps, flats and naturals.

17. The note translation device of claim 15 wherein said electronic processing circuitry means is further adapted for assigning finger numbers to use for pressing the strings against the fingerboard for playing said selected notes on said stringed fingerboard instrument.

18. The note translation device of claim 16 wherein said visual display means comprises a graphical representation of at least a segment of the instrument fingerboard and includes string and fingerboard position representations, and said visual indicators are located along said string representations such that each indicator corresponds to a unique string and fingerboard location to use when said indicator is activated.

19. The note translation device of claim 17 wherein said electronic processing circuitry means is further adapted for assigning finger numbers to use for pressing the strings against the fingerboard for playing said selected notes, and said visual indicators are adapted for displaying said assigned finger numbers at the locations to use for playing said selected notes on said stringed fingerboard instrument.

20. A method of translating note information which is representative of selected note symbols in printed music, to string and fingerboard location information to use for playing the notes on a stringed fingerboard instrument, comporising:

receiving coded note signals that correspond to selected note symbols shown in printed music;

storing coded note words representative of said coded note signals;

choosing combinations of string and fingerboard locations to use for playing the notes represented by said coded note words on said stringed fingerboard instrument, said combinations chosen so as to preclude more than one note being assigned to any one string, and said combination further chosen so as to preclude the separation between fingerboard locations that are used to play the notes from exceeding a predetermined maximum value thereby providing the translation from selected note symbols in printed music to string and fingerboard locations for playing the notes, and outputting coded representations of said chosen combinations of strings and fingerboard locations whereby said codes may be subsequently decoded to provide the information needed for playing said selected note symbols on said stringed musical instrument.

21. The method of claim 20 and further including generating said coded note signals by operating note switch means identifiably associated with said selected note symbols.

22. The method of claim 20 and further including displaying visual representations of said output coded representations of said chosen combinations of strings and fingerboard locations on a visual display.

23. The method of claim 20 and further including assigning finger numbers to use for playing the notes identified by said string numbers and fingerboard locations, and outputting coded representations of said assigned finger numbers.

24. The method of claim 23 and further including displaying said output coded representations of said selected finger numbers as digits located on a visual display representing at least a segment of the guitar fingerboard whereby the location of said digits indicates the strings and fingerboard locations where the fingers should be placed to play said selected note symbols.

25. The method of claim 24 and further including generating said coded note signals by operating note switch means identifiably associated with said selected note symbols shown in said printed music.

* * * * *